(12) United States Patent
Kurth et al.

(10) Patent No.: US 7,540,957 B1
(45) Date of Patent: Jun. 2, 2009

(54) MODULAR DRINKING WATER FILTRATION SYSTEM WITH BOTTOM LOAD CARTRIDGES WITH GRIP-ENHANCED END RINGS AND COLOR CODING

(75) Inventors: Michael J. Kurth, Howards Grove, WI (US); Paul W. Eserkaln, Sheboygan, WI (US); Kurt R. Kaiser, Cleveland, WI (US); Terry P. Zerger, Howards Grove, WI (US)

(73) Assignee: Pentair Filtration, Inc., Sheboygan, WI (US)

( * ) Notice: Subject to any disclaimer, the term of this patent is extended or adjusted under 35 U.S.C. 154(b) by 0 days.

(21) Appl. No.: 12/052,840

(22) Filed: Mar. 21, 2008

(51) Int. Cl.
*B01D 35/30* (2006.01)
*B01D 27/08* (2006.01)

(52) U.S. Cl. .................. 210/232; 210/234; 210/235; 210/444; 210/450; 156/73.1; 156/73.5; 156/69; 156/293; 156/294

(58) Field of Classification Search .................. 210/232, 210/234, 235, 444, 450; 156/73.1, 73.5, 156/69, 293, 294
See application file for complete search history.

(56) References Cited

U.S. PATENT DOCUMENTS

| | | | |
|---|---|---|---|
| 5,045,197 A | 9/1991 | Burrows | |
| 5,128,035 A | 7/1992 | Clack et al. | |
| 5,328,609 A * | 7/1994 | Magnusson et al. | 210/314 |
| 5,407,571 A * | 4/1995 | Rothwell | 210/232 |
| 5,753,107 A * | 5/1998 | Magnusson et al. | 210/109 |
| 5,826,854 A | 10/1998 | Janvrin et al. | |
| 6,001,249 A | 12/1999 | Bailey et al. | |
| 6,436,282 B1 | 8/2002 | Gundrum et al. | |
| 6,458,269 B1 | 10/2002 | Bassett et al. | |
| 6,533,931 B1 * | 3/2003 | Reid | 210/232 |
| 6,576,129 B1 * | 6/2003 | Reid | 210/232 |
| 6,776,906 B2 | 8/2004 | Reid | |
| 6,977,039 B2 * | 12/2005 | Knoll et al. | 210/232 |
| 7,138,052 B2 | 11/2006 | Reid | |
| 2005/0045552 A1 * | 3/2005 | Tadlock | 210/440 |

\* cited by examiner

*Primary Examiner*—Thomas M Lithgow
(74) *Attorney, Agent, or Firm*—Andrus, Sceales, Starke, Sawall, LLP

(57) ABSTRACT

An assembly method and related subassembly for a water filter element in the housing of a replaceable filter cartridge provides for filter element insertion into the open bottom end of the housing and subsequent attachment of a retaining ring to the upper end of the element such that the element is secured against vertical drop-out until the bottom end of the cartridge can be enclosed with an end cap. The method and subassembly are particularly well adapted to cartridges in which the lower end cap is attached by spin welding. The enclosing end cap may also be provided with end rings to enhance the user's grip in cartridge installation and removal. The end rings may also be color coded for each of cartridge identification and matching to the filter head.

12 Claims, 28 Drawing Sheets

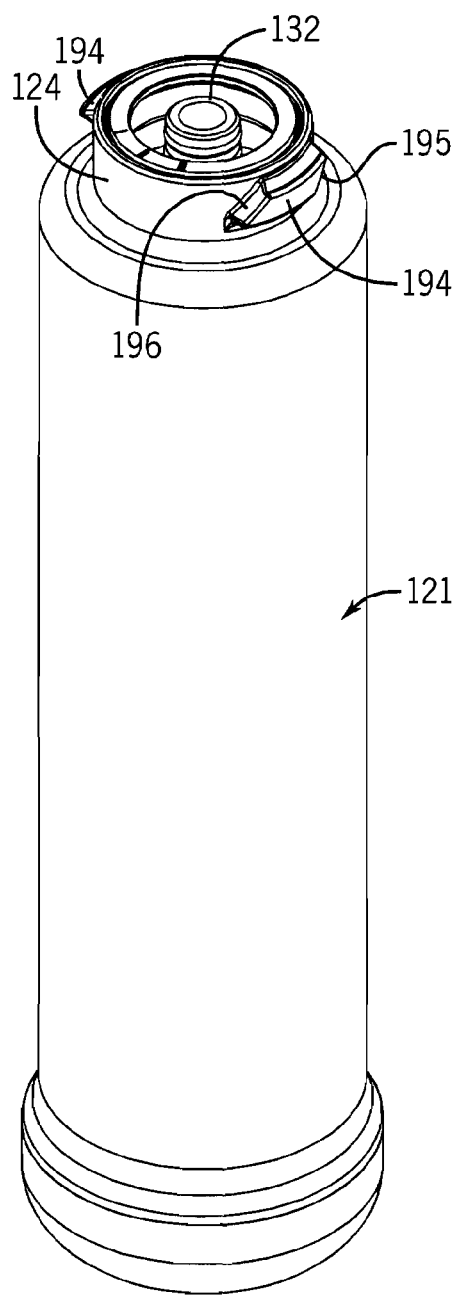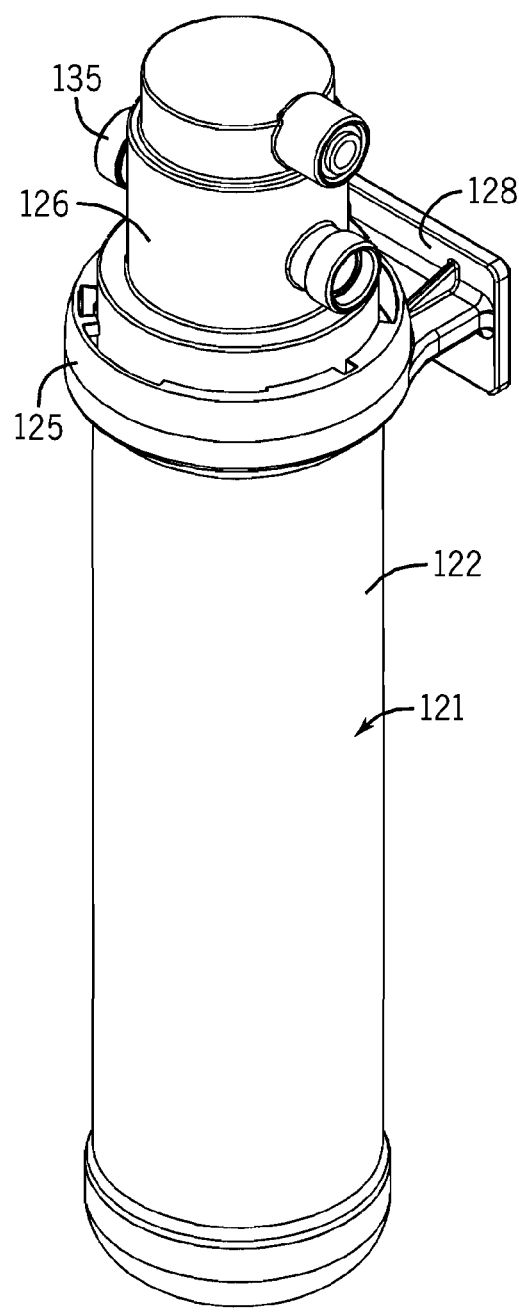
FIG. 18
FIG. 19

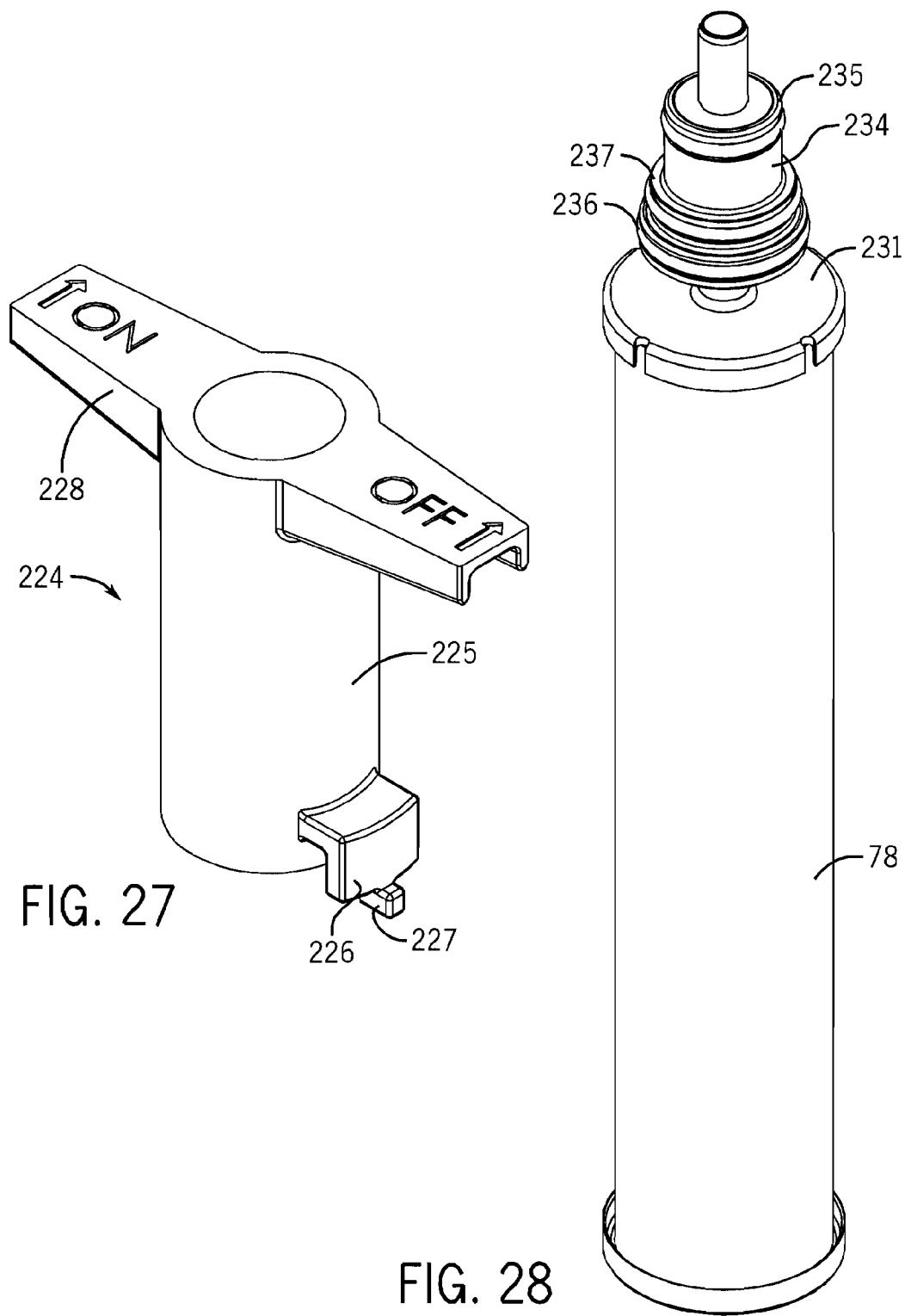

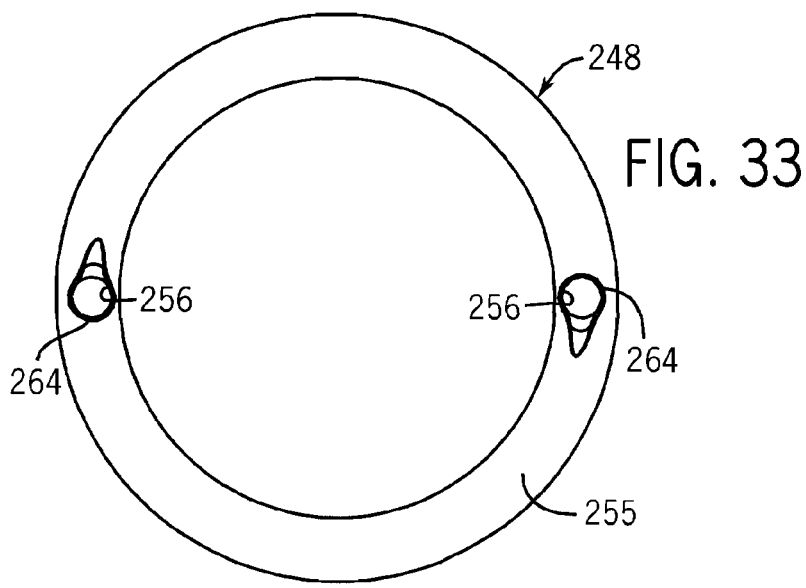
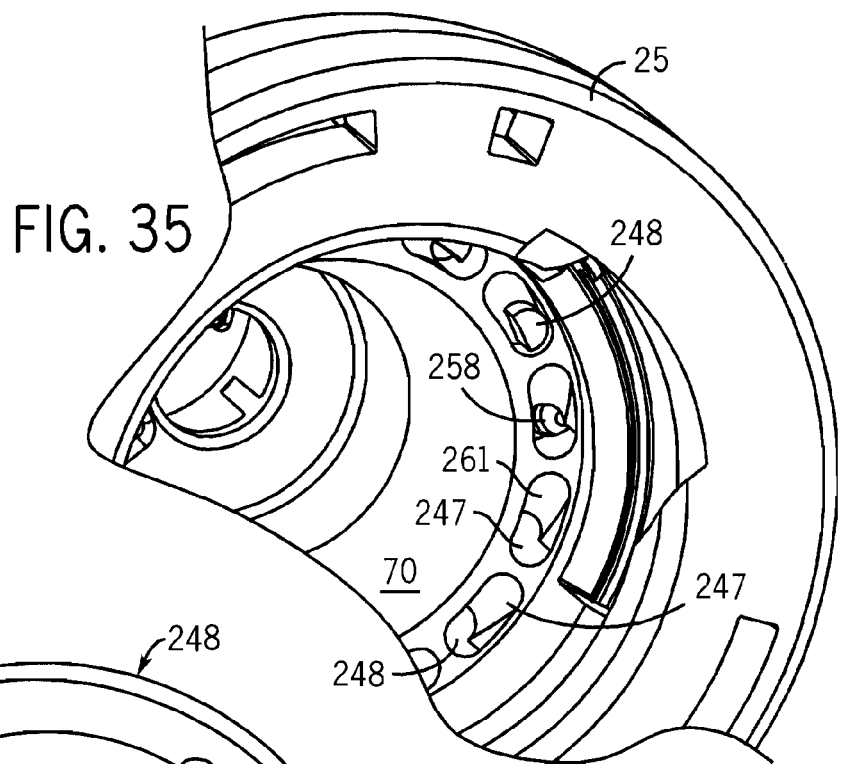
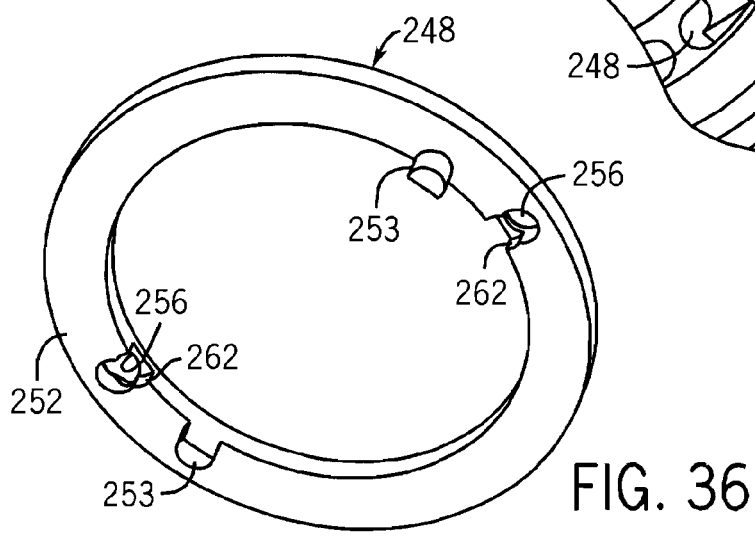

MODULAR DRINKING WATER FILTRATION SYSTEM WITH BOTTOM LOAD CARTRIDGES WITH GRIP-ENHANCED END RINGS AND COLOR CODING

BACKGROUND OF THE INVENTION

The present invention pertains to a drinking water purification system and, more particularly, to a modular system for under-counter or under-sink installation using replaceable cartridges and which may be configured in a system utilizing up to four cartridges, including a reverse osmosis (RO) cartridge.

A drinking water filter system adapted for under-counter mounting is shown in U.S. Pat. No. 6,436,282. The system is disclosed with three replaceable filter cartridges, one of which is an RO filter cartridge. The three cartridges are connected to a common header, but the dissimilarity between the three cartridges may require the use of a different attachment head within the header for each filter cartridge. Also, the header is designed for three cartridges, whereas it would be desirable to have a modular system utilizing from one to four filter cartridges, depending on the particular application.

It would also be desirable to have a modular system that could utilize from one to four separate filter cartridges, one of which could be an RO cartridge, in which the system could be assembled by the manufacturer or seller using identical filter heads and modularly connected mounting devices. Most cartridges could be provided with mounting arrangements and flow connections using the same head with the heads serially interconnected to form the desired configuration. An RO cartridge requiring a non-standard head could be designed for use in the modular assembly. It would also be desirable to have a modular system in which a proprietary fit could be provided that matches the filter cartridge to the head to assure proper fit.

The modular system described above, lends itself to an under-sink or under-counter system that is easy to install and provides easy cartridge replacement. Applying this modular design to the system of the present invention also provides the ability to utilize common filter heads with identical internal flow valve spindles that are controlled by attachment and removal of the filter cartridge, a simple and effective way of providing a seal between the spindle and the head, customizable key arrangement between the filter cartridge and the head that can be utilized to provide a proprietary feature for a seller and to assure use of the proper replacement cartridge, the ability to easily remove and replace the RO control valve in a special RO cartridge and head, and special assembly techniques that facilitate assembly of filter cartridges, including axially aligned inlet and outlet, color coded end rings and high friction end caps for facilitating cartridge replacement.

SUMMARY OF THE INVENTION

The present invention, in its various aspects, is applied to the combination of a replaceable water filter cartridge that has a filter body with an axially extending neck on one end, the neck having an inlet and an outlet for water, and a filter head that has an outer housing defining a cylindrical interior wall with an inlet opening for water to be treated and an outlet opening for treated water. A valve spindle is disposed in the outer housing for reciprocal rotary movement on the filter body axis between flow and no-flow positions, whereby connection and disconnection of the outer housing inlet opening and outlet opening with the cartridge inlet and outlet are provided. The spindle has an interior chamber for receipt of the cartridge neck to provide the flow connection and disconnection.

In accordance with one aspect of the present invention, an improved flow path and seal arrangement is provided whereby the spindle has a cylindrical outer wall portion that is positioned in closely spaced coaxial relation to the cylindrical interior wall of the outer housing; a pair of diametrically opposed and coaxially aligned flow ports are provided in the spindle outer wall portion which are aligned with the outer housing inlet and outlet openings in the flow position and out of alignment with those openings in the no-flow position; a unitary dual function seal is provided for each flow port, with each seal supported on the spindle outer wall portion and having an inner peripheral sealing rib that surrounds the flow port in the flow position and is in sealing engagement with the cylindrical interior wall of the outer housing in both the flow and no-flow positions, and an outer peripheral sealing rib surrounding the inner sealing rib and constructed and positioned to be in sealing engagement with the interior wall of the outer housing in both the flow and no-flow positions, the inner and outer ribs together preventing flow in the no-flow position.

The improved flow path and seal arrangement preferably includes a mounting recess in the face of the spindle outer wall portion in which the inner and outer sealing ribs of the seal are received. An intermediate web connects the inner and outer sealing ribs and is seated in the mounting recess. The inner rib is preferably circular in shape, and the mounting recess is provided with an integral cylindrical nipple that defines the flow port and extends radially outward into sealing and supporting contact with the seal inner rib.

In accordance with another aspect of the invention, an arrangement is provided to assure compatibility and operative connection of the cartridge to the filter head. The arrangement includes a first adaptor ring that has a first half of a locator device formed thereon, the first adaptor ring is mounted in the head coaxially with the interior wall with the first half of the locator device positioned at a circumferentially selected position. A second adaptor ring has a second half of the locator device formed thereon, the second adaptor ring is mounted on the filter cartridge surrounding the neck and coaxially therewith. The second half of the locator device is positioned at a circumferentially selected position to engage the first half and to permit operative connection of the cartridge to the head.

In a presently preferred embodiment, the upper adaptor ring and the lower adaptor ring are provided with integral weld flanges that seat in respective complementary weld grooves in the spindle and on the neck of the cartridge body. The rings are secured by spin welding. The exposed face of the upper adaptor ring have a pair of diametrically opposite axial extending fingers that engage a pair of diametrically opposite recesses in the lower adaptor ring to ensure compatibility between the filter cartridge and the head. The upper and lower adaptor rings may be selectively circumferentially repositioned to provide a proprietary fit for selected customers. Further, the position of the fingers and complementary recesses may be varied radially on the ring surfaces to provide an even broader range of proprietary fits.

In another embodiment, the first half of the locator device comprises a first axially facing non-planar surface that defines a first axially extending abutment face. The second half of the locator device comprises a second axially facing non-planar surface that complements the first non-planar surface and defines an oppositely facing second axially extending abutment face. Relative rotation and axial displacement of the cartridge on its axis and with respect to the filter head interior wall results in engagement of the abutment faces. It is particularly preferred to use diametrically opposed pairs of first and second halves of the locator device.

One of the axially facing non-planar surfaces has an axial protrusion that defines the abutment face, and the other axially facing non-planar surface has an axial recess that defines the abutment face. Preferably, the filter head comprises an outer housing that defines an inner cylindrical wall having an inlet opening for water to be treated and an outlet opening for treated water. A valve spindle is rotatably disposed in the outer housing for rotary reciprocal movement between flow and no-flow positions that connect and disconnect the outer housing inlet opening and outlet opening with the cartridge inlet and outlet, respectively. The valve spindle defines the cylindrical interior wall for receipt of the cartridge neck.

The first adaptor ring is attached to a first mounting surface on the cylindrical interior wall of the valve spindle, and the second adaptor ring is attached to a second mounting surface on the neck of the filter body. The first and second mounting surfaces comprise annular shoulders of generally the same diameter. The adaptor rings are preferably attached to their respective mounting surfaces with welds, preferably friction welds, and more preferably spin welds. The adaptor rings are positioned circumferentially to assure engagement of the second abutment face of a selected filter cartridge with the first abutment face in the spindle.

In a variant embodiment, the first half of the locator device comprises a notch formed in the first adaptor ring, and the second half of the locator device comprises an axially extending finger on the second adaptor ring, the finger sized and positioned to engage the notch to establish operative connection. A housing is provided for the filter body that has a circular open end through which the neck of the filter body extends. An annular end cap interconnects the filter body and the neck and provides a sealed connection to the open end of the housing in a fully assembled state. An orientation recess is provided in the end cap to engage with a complementary orientation tab on the inside of the housing open end. The tab is received in the recess in the fully assembled state to fix the circumferentially selected position of the finger on the second adaptor ring. The adaptor rings in this embodiment are attached with welds, preferably ultrasonic welds.

In accordance with another aspect of the present invention, an arrangement is provided for mounting the filter head and demountably supporting the filter cartridge, the arrangement includes a mounting bracket and an integral mounting ring. The improved arrangement includes a filter head outer housing with a pair of oppositely extending coaxial sleeves that define the inlet opening and the outlet opening. A mounting lug arrangement is provided on the filter head outer housing and a cooperating slot arrangement is provided on the mounting ring to permit the housing and valve spindle to be connected and locked to the mounting ring in an operative position. The outer housing has a lower cylindrical skirt and the lug arrangement includes a pair of diametrically opposite mounting lugs that are integrally formed on the lower edge of the skirt. The mounting ring has an annular recess for receipt of the housing cylindrical skirt and a pair of slots for receipt of the mounting lugs, one of the mounting lugs adapted to fit in only one of the slots to assure proper flow orientation of the co-axial inlet and outlet sleeves. A circular track in the mounting ring annular recess is dimensioned to receive the mounting lugs in response to rotation of the outer housing in the recess, and a stop detent on the cylindrical skirt overrides and engages a first stop in the track to prevent reverse rotation and establish the operative position. In addition, a locking detent is provided on the cylindrical skirt to engage a second stop in the track, the second stop preventing reverse rotation of the outer housing from the operative position.

The apparatus also includes an arrangement for operatively attaching the filter cartridge to the mounting ring and the filter head. In this arrangement, a pair of opposed attachment lugs are provided on the neck of the filter cartridge, a pair of entrance slots are provided in the lower edge of the mounting ring for receipt of the attachment lugs upon vertical upward axial movement of the cartridge neck into the filter head. The entrance slots terminate in an annular shoulder that is engageable by and supports the attachment lugs in response to rotational movement of the attachment lugs along the shoulder relative to the mounting rings. The filter cartridge is thereby supported in an operative position by the mounting ring. Preferably, the lead ends of the attachment lugs, in the rotational direction, are provided with tapered faces and the entrance slots are provided with cooperating ramped faces to facilitate axial and rotational movement of the cartridge.

Preferably, the lower end of the valve spindle is provided with a spindle skirt in the lower edge of which is provided a pair of notches. Cooperating semi-annular recesses are formed in the inner lower edge of the outer housing skirt to receive the attachment lugs. The notches have end faces that are engageable by the lead ends of the attachment lugs in response to rotational movement of the lugs to establish a rotational limit of the filter cartridge and the operational position thereof.

In a related embodiment, the mounting bracket is preferably rectangular in shape, and the mounting arrangement includes a modular back plate that has a generally planar base and a front mounting face having an open-ended mounting slot defined by parallel tracks. The mounting slot is adapted to receive the edges of the mounting bracket as it is inserted into the open-ended slot, and a bracket stop is engageable by the mounting bracket upon full insertion thereof into the slot. Preferably, the bracket stop comprises a notch in one edge of the mounting bracket engageable by a detent in the associated track. The back plates are preferably provided with parallel opposite edges that have complimentary engagement devices for modular interlocking connection of adjacent back plates.

The face of the back plate extends away from the mounting slot and includes a reinforcing guide arrangement adapted to engage and facilitate axial alignment of the filter cartridge body for attachment to the mounting ring, and to stiffen the mounting bracket. Preferably, the reinforcing guide arrangement comprises a pair of spacer panels extending perpendicularly from the mounting face and a series of spaced gussets connected to the mounting face, the panels support a cradle between the panels for supporting the filter cartridge body.

The mounting arrangement also includes a cover that has a hinged connection to the back plate along one edge adjacent the filter head. The opposite edge of the cover has a latching connection to the other edge of the back plate. The cover encloses the filter head and the mounting ring and has passages that are axially aligned, in the latched position, with the mounting ring. This arrangement allows the filter cartridge to be removable and replaceable through the passages in the cover by manual engagement of the free end of the cartridge. The side edges of the cover preferably include complementary connecting devices to provide modular interlocking of adjacent covers.

In accordance with another aspect of the present invention, an arrangement is provided for the removal and replacement of a special spindle for use with a reverse osmosis or other semi-permeable membrane filter cartridge. The valve spindle for use with an RO cartridge houses a special dual diaphragm shut off valve that is replaceable with the spindle. In this embodiment, the spindle is demountably locked to the filter head outer housing. A spindle lock arrangement includes an annular groove in an exterior wall of the spindle, preferably above the dual function seals. The exterior spindle wall is coaxial with the spindle outer wall portion and the groove is provided with a slot that forms an axially extending passage therethrough. A lug on the interior of the filter head outer housing is received in the groove and holds the spindle against axial displacement from the filter head housing over a range of spindle rotation including spindle movement between the flow and no-flow positions. The lug is adapted to move circumferentially in and relative to the annular groove and axially relative to and through the slot in response to disconnection of the filter cartridge, manual rotation of the spindle beyond the above identified range, and axial movement of the spindle out of the outer housing.

The filter cartridge comprises a semi-permeable membrane filter. The semi-permeable membrane may comprise an ultra filter membrane or a reverse osmosis membrane.

The mounting ring for the filter head and cartridge includes an annular recess for receipt in one axial direction and attachment of the filter head housing, and for receipt in the opposite axial direction and demountable attachment of the filter cartridge neck. The filter housing and cartridge neck capture the spindle in an operative position therebetween. The apparatus is preferably provided with a manually operable removal tool that has a spindle engagement lug on one axial end that is adapted to engage the spindle to overcome seal friction and facilitate spindle removal.

The water filter elements used in the apparatus of the present invention are carried in housings of similar size and shape to accommodate modular construction in addition to convenient replaceability. A preferred method for assembling a water filter element in a housing for such a replaceable filter cartridge utilizes a housing that has an open operative end defined by an annular reduced diameter portion. The filter element has an end closure with an axially extending neck that sealingly engages the interior of the reduced diameter portion of the housing and includes an end that extends axially past the reduced diameter portion. The engagement of the filter element with the interior of the reduced diameter portion of the housing defines a stop position. The neck also has an inlet and an outlet for water. The assembly method includes the steps of (1) providing the opposite end of the housing with an annular opening for receipt of the filter element, (2) inserting the filter element axially through the annular opening until the element reaches the stop position, (3) attaching a retaining ring to the neck of the filter element at a position axially beyond and in engagement with the end of the reduced diameter portion of the housing when the filter element is in the stop position to retain the element from reverse axial movement, and (4) attaching a housing end cap to the annular opening in the housing to seal the opening and to hold the filter element in the stop position.

The foregoing method preferably includes the steps of (1) providing an annular groove in the neck of the filter element, and (2) placing the retaining ring in the annular groove. The retaining ring preferably comprises an O-ring.

The method also preferably includes attaching the housing end cap by spin welding. Ultrasonic welding may also be used. It is also preferred to attach a cap grip to the housing end cap which cap grip may include the step of coding the cap grip with cartridge identification indicia. Such indicia may comprise color coding. The attaching step may comprise snap fitting and the grip preferably is provided with a high friction surface to enhance manual gripping.

A subassembly provided by the foregoing assembly method includes a cylindrical housing that has an opening having an open operative end defined by an annular reduced diameter portion and an annular opening in the opposite end of a diameter larger than the diameter of the open operative end. A filter element is positioned in the housing and has an end closure with an axially extending neck making sealing contact with the interior of the reduced diameter portion. The filter element has a major diameter smaller than the annular opening and larger than the open operative end such that the filter element is positioned in the housing against an axial stop to define an operative position. A retaining ring is attached to the filter element neck at a position axially beyond and in engagement with the end of the reduced diameter portion of the housing to retain the element against axial movement.

BRIEF DESCRIPTION OF THE DRAWINGS

FIG. 18 is a perspective view of the RO filter cartridge used in the FIG. 13 system.

FIG. 19 is a perspective view of the cartridge shown in FIG. 18 attached to the mounting ring and filter head.

FIG. 27 is a perspective view of a spindle removal tool.

FIG. 28 is a perspective view of a filter element of the cartridge shown in FIG. 8.

FIG. 33 is a top plan view of the adaptor ring used in the FIG. 31 arrangement.

FIG. 35 is a perspective end view of the valve spindle and locking pin arrangement.

FIG. 36 is a perspective bottom view of the adaptor ring shown in FIG. 33.

DETAILED DESCRIPTION OF THE PREFERRED EMBODIMENTS

Figure 1:
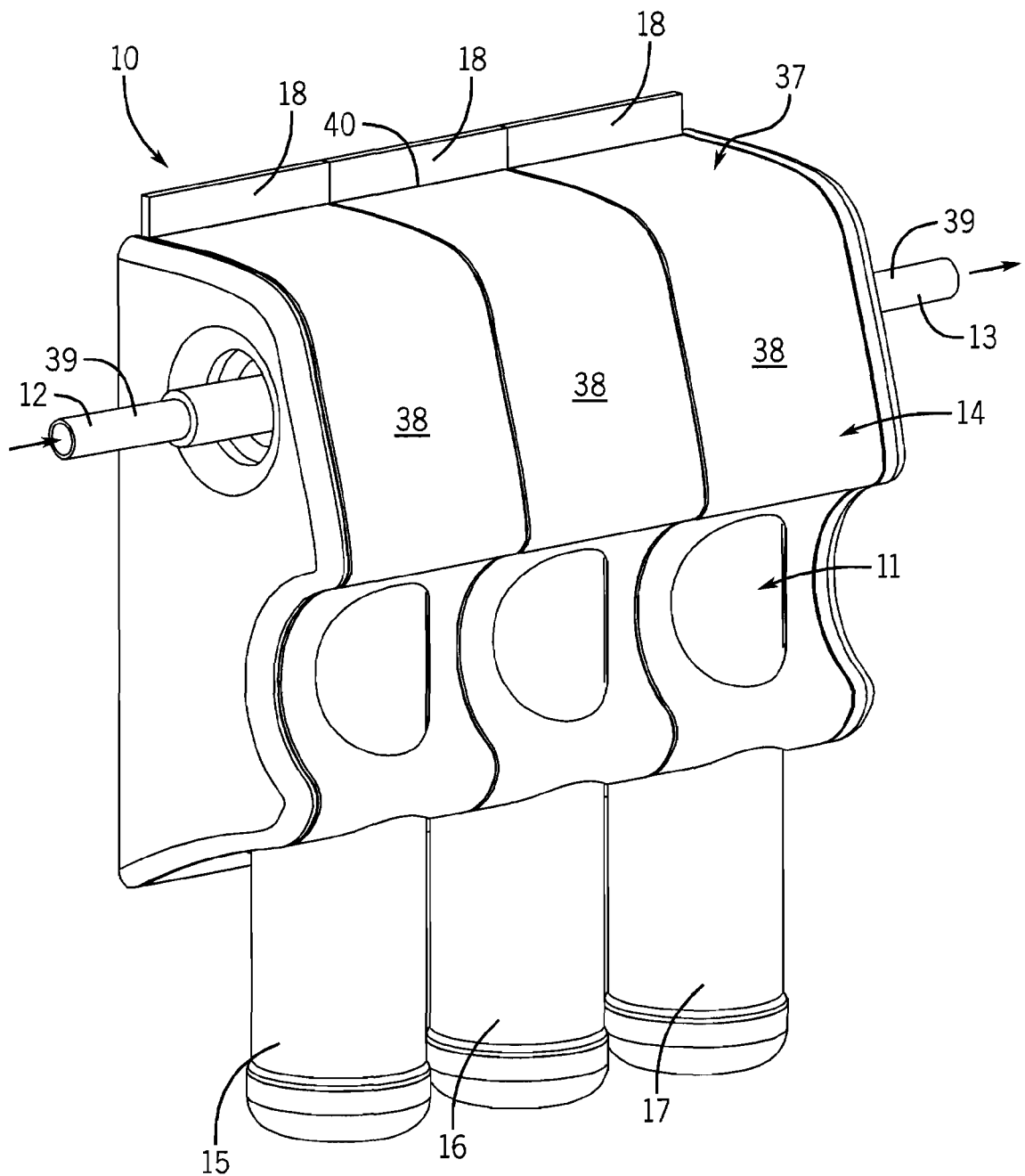
FIG. 1 is a front perspective view of a drinking water filtration system utilizing the modular construction of the present invention.
Figure 2:
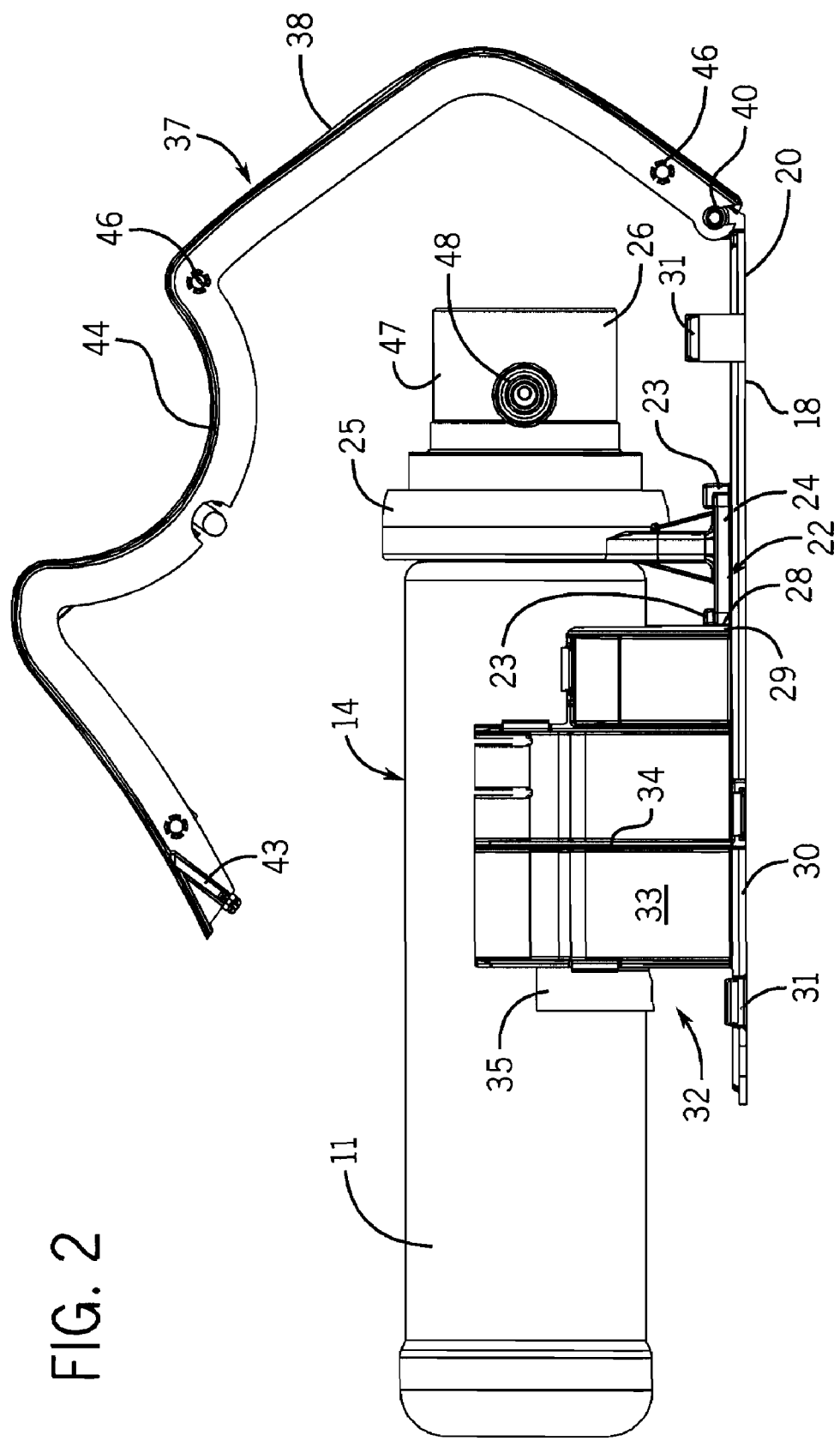
FIG. 2 is a side elevation view of the system shown in FIG. 1.

The water filter system 10 shown in FIG. 1 includes three replaceable filter cartridges that are hydraulically connected to provide serial treatment of untreated water entering the system via inlet 12 and exiting the system as treated water via outlet 13. Each cartridge 11 forms part of an independent filter module 14 that can function as a separate filter unit or, as shown, be connected to adjacent modules 14 to form a system including as many as four or more cartridge modules. Furthermore, the cartridges 11 chosen for use in the modular system 10 can perform widely varying filter functions. For example, in the system shown, the first cartridge directly receiving untreated water through the inlet 12 may comprise a granular activated carbon filter element. The second cartridge, receiving pretreated water from the first cartridge may comprise a reverse osmosis (RO) filter unit, and the third cartridge 17 may comprise a final or polishing filter that receives filtered water directly from the RO filter 16 (or from a pressurized storage tank, not shown) from which it is discharged for use via the treated water outlet 13.

The filter system 10 shown in FIG. 1 is mounted with the filter cartridges 11 disposed vertically on their axes, but an important feature of the present invention permits the attachment of a modularly constructed system at virtually any orientation of the cartridges. Furthermore, as will be explained in greater detail, the modular filter system 10 lends itself well to custom assembly of the system to meet a customer's particular needs in a manner utilizing common parts and convenient interconnection.

Each filter module 14 includes a back plate 18 that comprises the main support structure and provides the means for mounting the module to any convenient flat surface, such as the inside surface of a cupboard below a sink. The back plate 18 has a generally planar base 20 that includes a pair of spaced universal mounting openings 21 for convenient attachment of the back plate to the supporting surface. The front face of the back plate 18 has an open-ended mounting slot 22 defined by a pair of parallel tracks 23. The mounting slot tracks 23 are sized to receive the edges of a rectangular mounting bracket 24 that carries an integral mounting ring 25. The mounting ring 25 provides support for and an interconnection of a cartridge 11 and a filter head 26, which interconnection will be described in greater detail below.

The mounting bracket 24, carrying the mounting ring 25, is slid into the tracks 23 defining the mounting slot 22 until an internal bracket stop is engaged when the mounting bracket is fully inserted. The bracket stop may comprise a notch 27 in one edge of the bracket that is engaged by a detent 28 in the associated track 23 when the bracket is fully inserted. Because the mounting slot 22 is open ended on both ends, the mounting bracket 24 may be slid directly through the mounting slot 22 on one back plate 18 and into the mounting slot on the next adjacent back plate by manually overcoming the locking provided by the bracket stop 29 and moving the mounting bracket linearly.

The side edges 30 of the back plates 18 are provided with complementary hook-and-slot edge connectors 31, enabling adjacent back plates to be interconnected to provide a modular construction. A portion of the back plate base 20 provided with a reinforcing and cartridge guide arrangement 32 that includes a pair of spacer panels 33 that include stiffening gussets 34 and between which is supported a cradle 35 that helps support and guide the cartridge 11 as it is inserted through the mounting ring 25 and into operative engagement with the filter head 26. Certain of the stiffening gussets 34 are also provided with hook-and-slot edge connectors 36 to help provide rigidity in the modular assembly of back plates 18.

Adjacent filter heads 26 are interconnected with flexible tubular connectors 39. A connector 39 has one end inserted in an inlet sleeve 48 in the filter head and the other end in an outlet sleeve 50 of the next adjacent filter head. Axial alignment of the inlet and outlet sleeves 48 and 50 makes connection of adjacent filter modules 14 easy and reliable.

Figure 3:
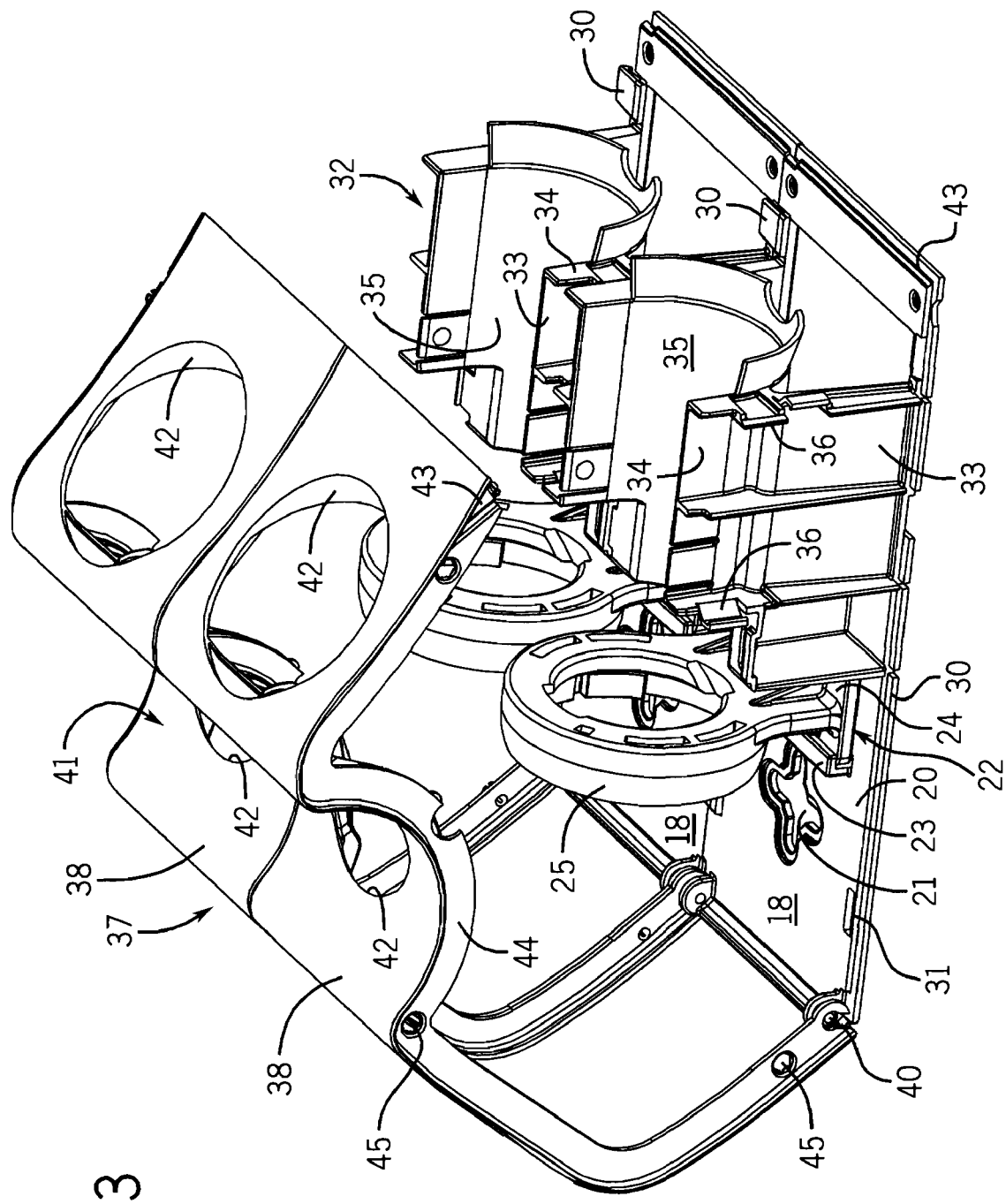
FIG. 3 is perspective view of the filter system with the enclosing housing opened to show features of the system construction.

The modular assembly of the filter system 10 is completed with an enclosing housing 37 that further helps secure the filter cartridges 11 in their mounted positions, facilitates cartridge removal and replacement and provides an aesthetic covering for the system. The housing is also modular insofar as each back plate 18 carries its own housing module 38. Each housing module has a hinged connection 40 to an edge of the back plate 18, enabling the housing module 38 to be pivoted away from the back plate for installation of the mounting bracket 24 and filter head 26, both of which are typically interconnected and mounted together by sliding the mounting bracket into the mounting slot 22. However, adjacent housing modules 38 are also interconnected so that in a fully assembled filter system 10, all of the housing modules 38 pivot together between the open position shown in FIG. 3 and the closed position shown in FIG. 1. Each housing module 38 has an irregular shaped wavy front face 41 that defines three oblong cartridge openings 42. When the housing modules 38 are pivoted to the closed position, the edge opposite the hinged connection 40 latches onto the edge of the back plate base 20 with a spring-lock connection 43 that can be manually released by the user to open the housing should it be necessary to access the filter head 26. In the closed position of the housing 37, the oblong cartridge openings 42 are axially aligned and axially aligned with the cradle 35 and mounting ring 25, such that a filter cartridge 11 may be inserted axially through the mounting ring 25 and into the filter head 26. In the mounted position, as shown in the drawings, the free end of the filter cartridge 11 is accessible to and may be conveniently grasped by the user to turn and remove the cartridge, as will be discussed in greater detail below.

The wavy edges 44 of the housing front face 41 are provided with connector openings 45 which, when adjacent housing modules 38 are aligned, can be connected with circular spade connectors 46. It will be appreciated that by use of back plate edge connectors 31, edge connectors 36 on adjacent spacer panels 33, the hinged connection 40 for the housing module and spade connectors 46 for adjacent housing modules 38, a very rigid assembly may be produced. Furthermore, as suggested above, the mounting openings 21 in the back plate base 20 permit the mounting of the system in virtually any orientation that provides access of the filter cartridges 11 to the user.

Figure 4:
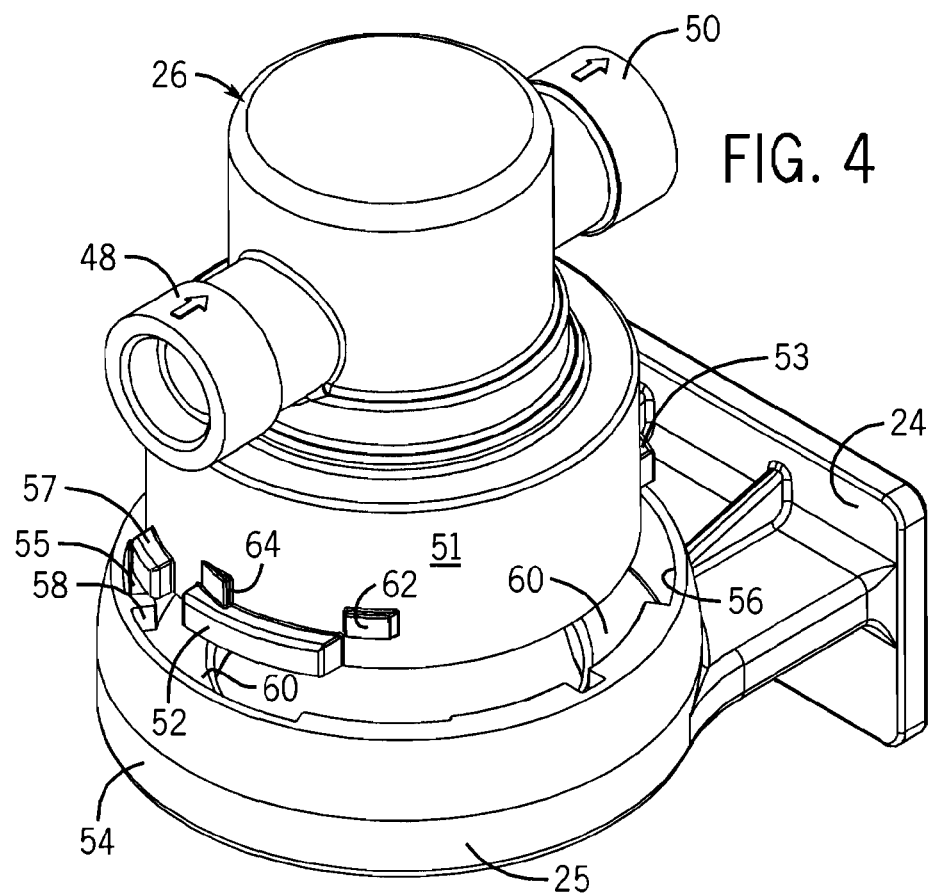
FIG. 4 is an exploded perspective view of the mounting bracket and filter head subassembly.
Figure 5:
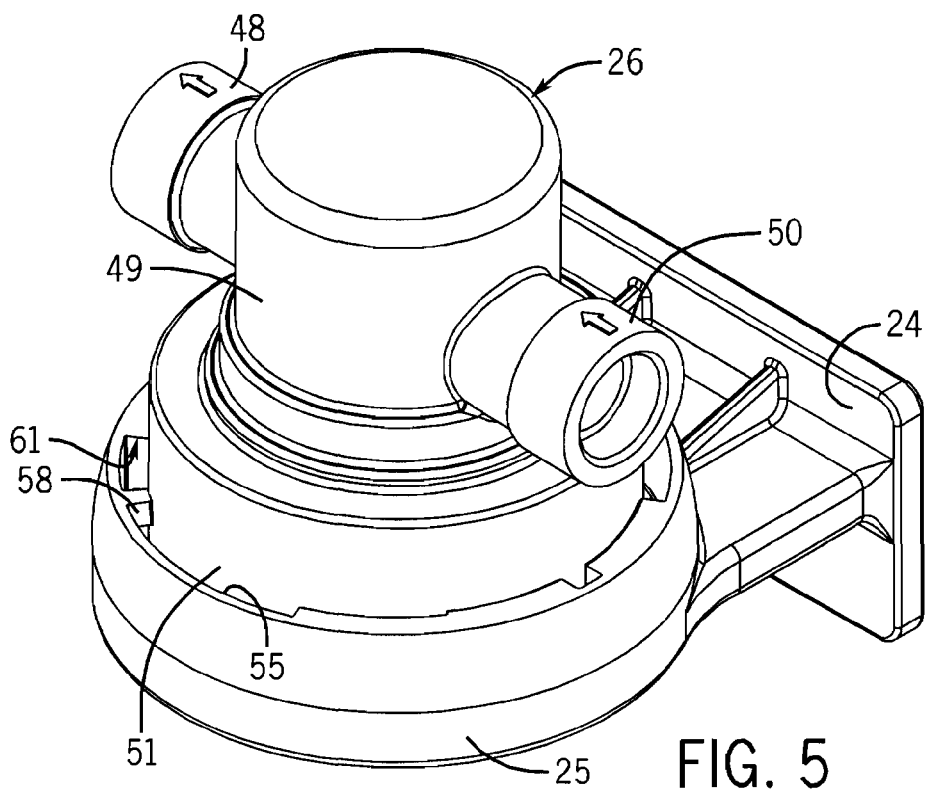
FIG. 5 is a perspective view of the subassembly shown in FIG. 4 with the filter head attached to the mounting bracket.
Figure 6:
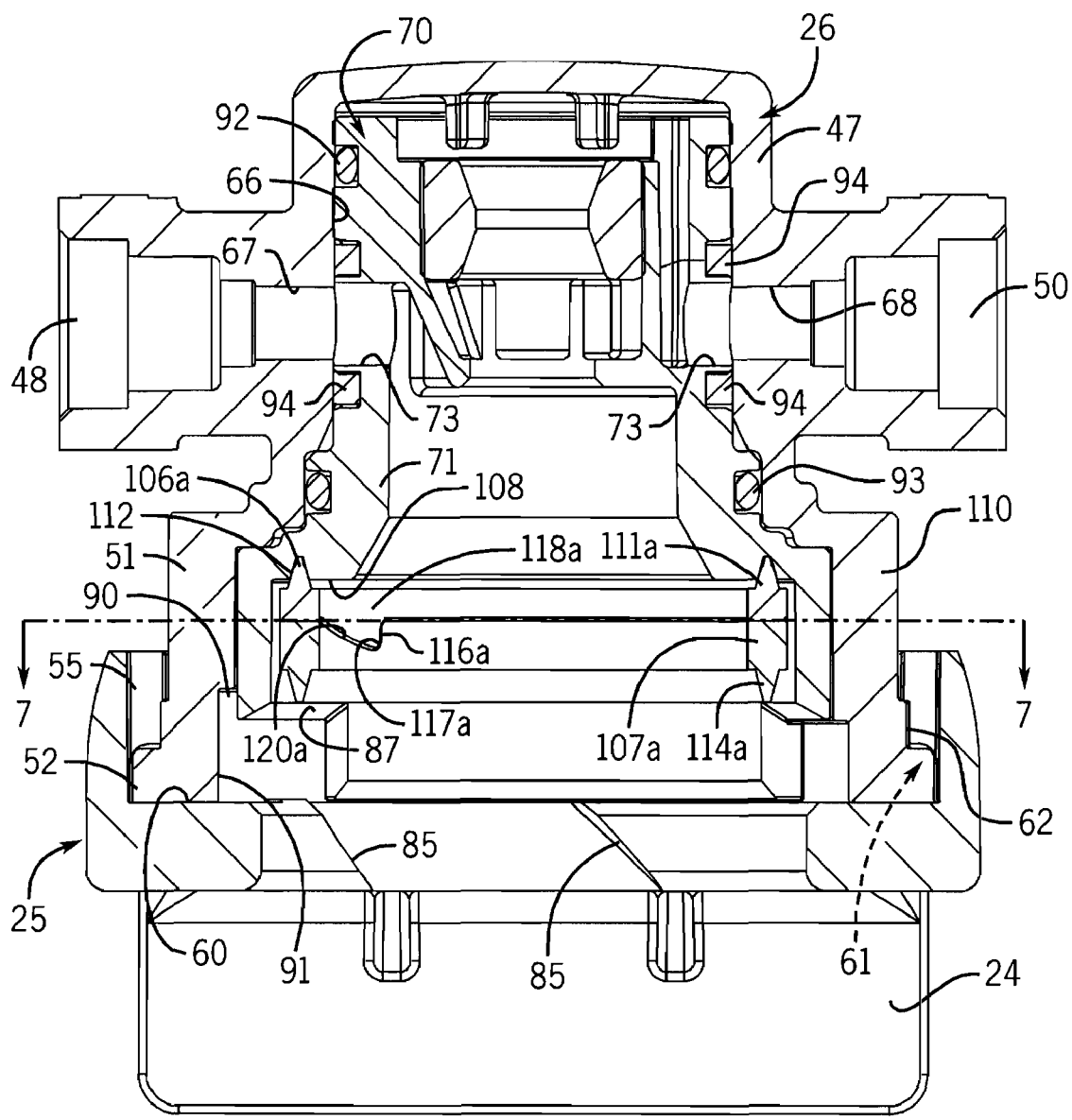
FIG. 6 is a vertical section of the subassembly shown in FIG. 5, additionally showing the valve spindle.
Figure 7:
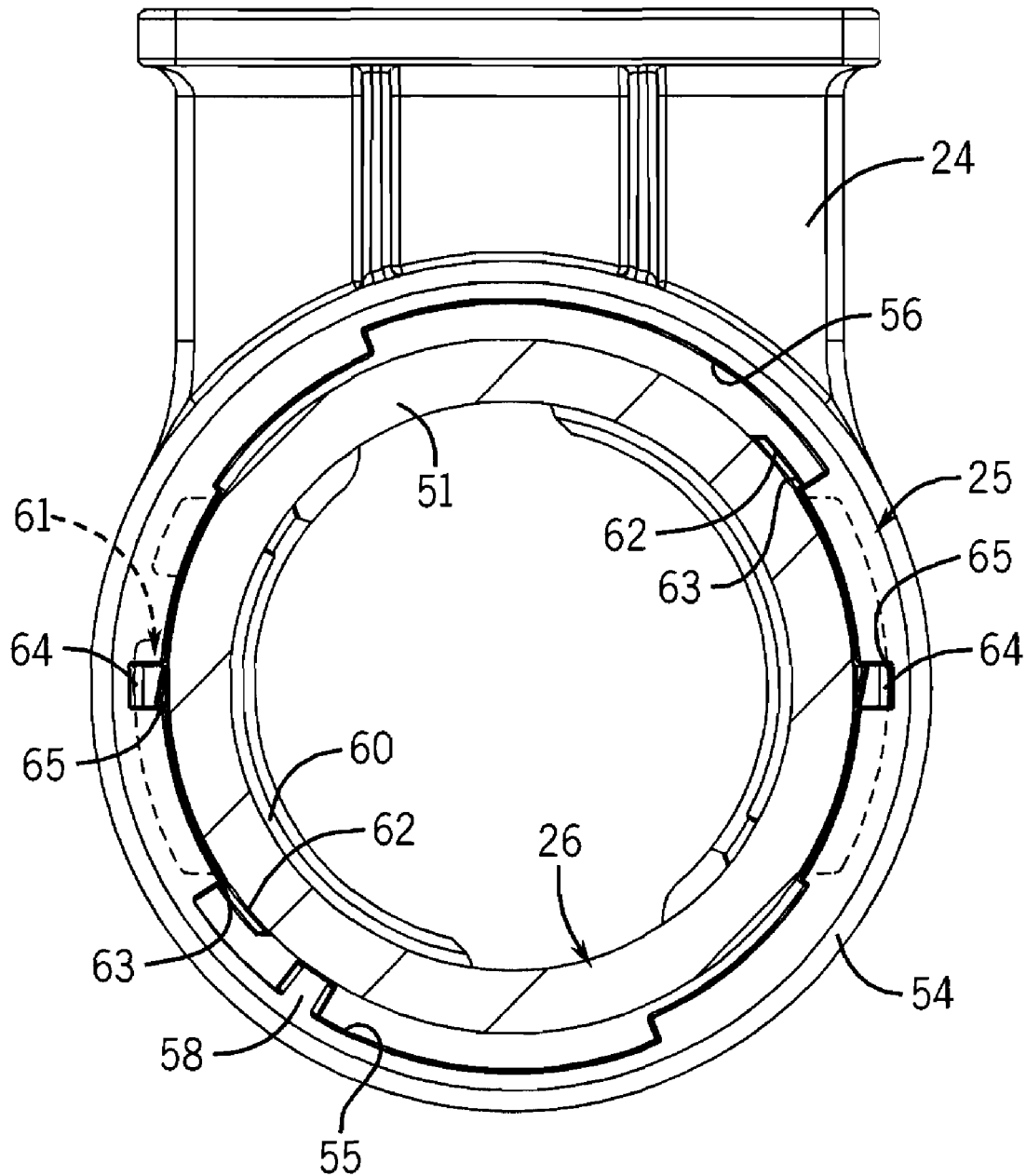
FIG. 7 is horizontal section taken on line 7-7 of FIG. 5.

Referring now to FIGS. 4-6, the mounting ring 25 on the mounting bracket 24 provides attachment for the filter head 26 and a demountable support for the filter cartridge 11. The filter head 26 also provides flow connections to and from the filter cartridge, the operative end of which is inserted axially into the filter head. The filter head includes a cylindrical top portion 47 that defines an outer housing 49 carrying a pair of oppositely extending coaxial sleeves 48 and 50 that define, respectively, the water inlet opening and water outlet opening to and from the filter head. On the interior of the filter head housing, there is mounted a flow control valve spindle, the function of which will be described in detail below.

The filter head outer housing 49 has a bottom cylindrical skirt having a diameter somewhat larger than the top portion 47. The edge of the cylindrical skirt 51 is provided with a pair of diametrically opposite mounting lugs 52 and 53. The mounting ring 25 has a generally open annular interior including an outer wall 54 sized to receive the cylindrical skirt 51 of the filter head outer housing 49. The upper edge of the mounting ring outer wall 54 includes a pair of inwardly opening slots 55 and 56, respectively, for receipt of the mounting lugs 52 and 53. Mounting lug 52, positioned below the inlet sleeve 48, is provided with an open gap 57. The slot 55 in the mounting ring outer wall 54 has a protrusion 58 sized to move axially through the gap 57 as the housing cylindrical skirt 51 moves axially into the mounting ring 25. By comparison, the housing mounting lug 53 (diametrically opposite mounting lug 52) has no gap and the slot 56 does not have a protrusion. As a result, the filter head 26 can only be inserted into the mounting ring at one circumferential position. As the cylindrical skirt 51 of the filter head drops through the slots, the lower edge comes to rest on a circular track 60 on the interior of the mounting ring. The track 60 defines the bottom of an annular slot 61 having a height just slightly larger than the thickness of the mounting lugs 52 and 53 such that, when the filter head is rotated on the circular track 60, the lugs 52 and 53 pass into the annular slot 61 until the filter head is in an operative position with the axis of the coaxial inlet and outlet sleeves 48 and 50 is parallel to the mounting bracket 24, as shown in FIG. 5. In this position, stop detent 62 on the cylindrical skirt 51 engages a first stop 63 in the circular track 60 to prevent reverse rotation and establish the operative position of the filter head. Further, a locking detent 64 on the cylindrical skirt 51 simultaneously engages a second stop 65 on the circular track to prevent continued rotation of the filter head and to lock it in its operative position.

Figure 8A:
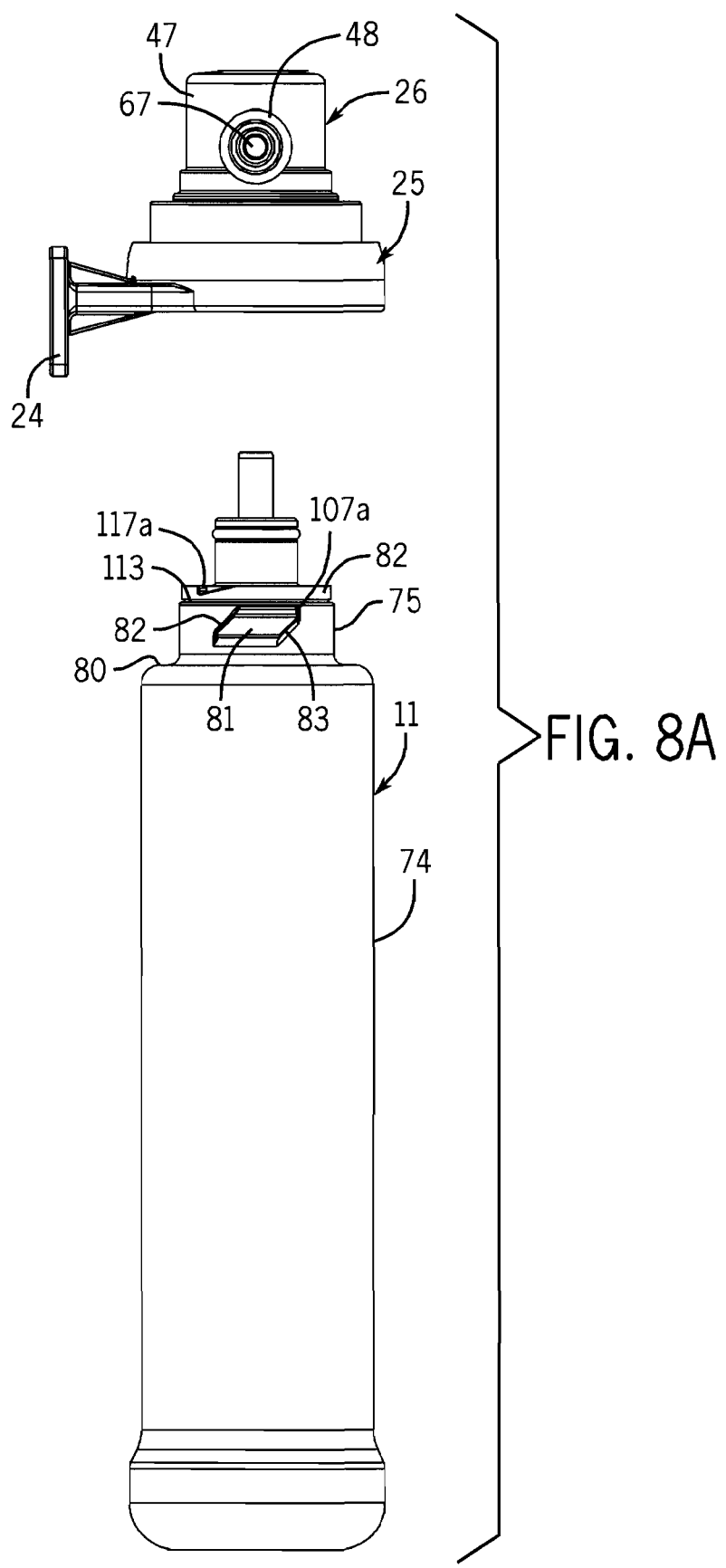
FIG. 8A is an exploded elevation view of the filter head, mounting racket and filter cartridge assembly.
Figure 8B:
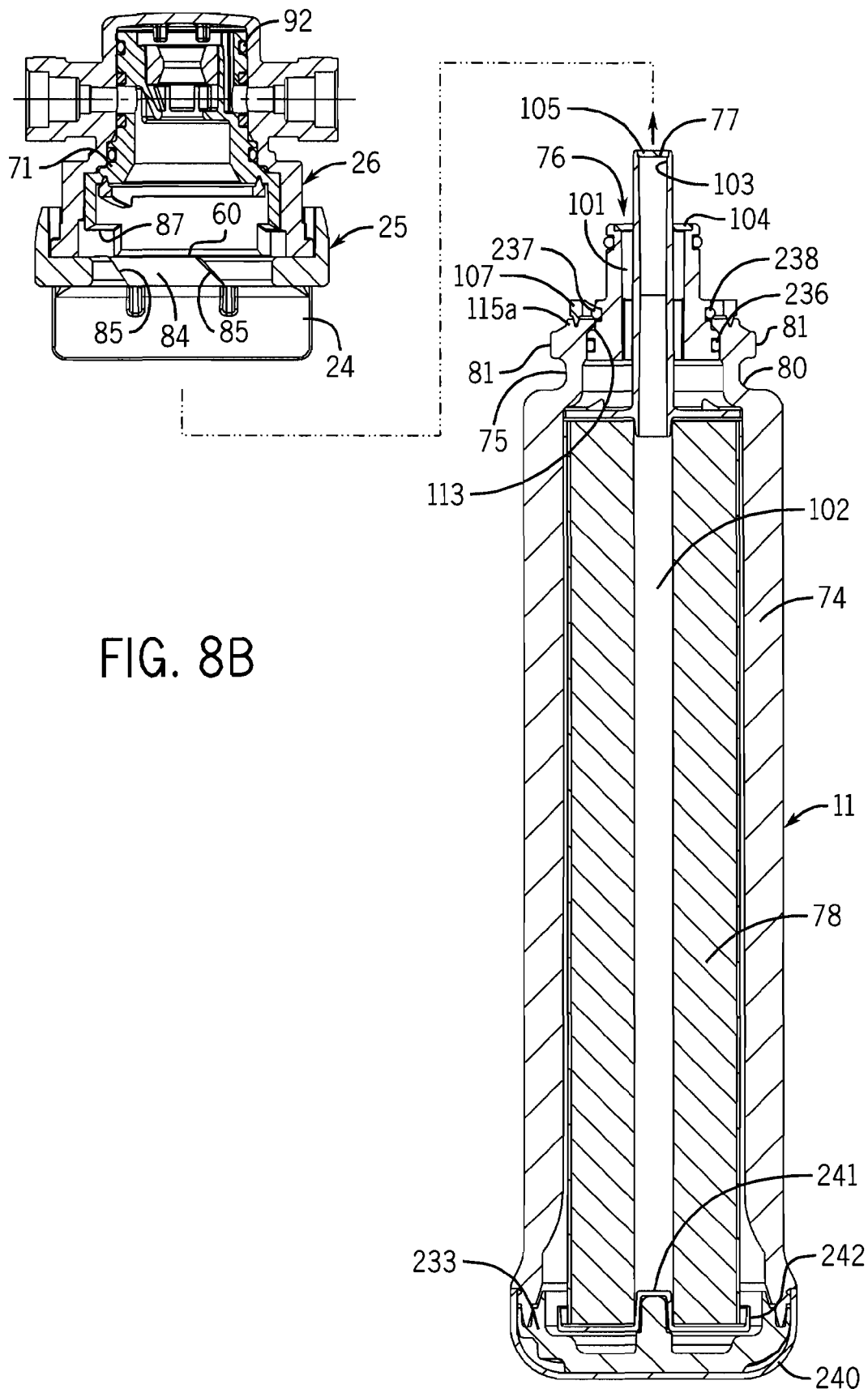
FIG. 8B is an exploded vertical section of the head, mounting bracket and filter cartridge assembly taken on line 8B-8B of GI. 8A.

Referring to FIG. 6, the top portion 47 of the filter head 26 has a cylindrical interior wall 66 in which are formed diametrically opposite inlet opening 67 from the inlet sleeve 48 and outlet opening 68 to the outlet sleeve 50. Referring also to FIGS. 8A and 8B, the outer housing 49 of the filter head 26 houses a valve spindle 70, the reciprocal rotary movement of which controls the flow of water into and out of the filter cartridge 11. The filter cartridge is inserted axially through the bottom of the mounting ring 25 where a combination of vertical axial movement and rotational movement simultaneously locks the cartridge 11 onto the mounting ring 25 and rotates the spindle 70 from the off (no-flow) position to the on (flow) position. The valve spindle 70 has a cylindrical body 71 that is positioned in closely spaced coaxial relation to the cylindrical interior wall 66 of the filter head 26. The cylindrical spindle body 71 has a pair of diametrically opposed and coaxially aligned flow ports 73 which move, with rotation of the spindle 70, between the flow and no-flow positions to provide connection and disconnection of the inlet and outlet openings 67 and 68 in the filter head interior wall with the cartridge inlet and outlet, which will now be described.

The filter cartridge 11 has a body 74 with an axially extending neck 75 on one end. The neck defines an inlet 76 for water to be treated and an outlet 77 for water treated by flow through an interior filter element 78. The neck 75 has a stepped construction including a large diameter shoulder 80 adjacent the filter body 74 that has an annular shape, but is interrupted by a pair of diametrically opposed connector lugs 81. In cross section, the connector lugs 81 have a parallelogram shape with narrow leading and trailing edges 82, in the rotational direction, that define cam surfaces 83. The circular track 60 in the mounting ring 25 has a pair of diametrically opposed slots 84, each of which has angled contact surfaces 85 that define openings through which the connector lugs 81 on the filter cartridge neck may pass. As the filter cartridge neck 75 is inserted axially into the mounting ring 25 and spindle 70, simultaneous rotation of the cartridge to the right (in the clockwise direction) will permit the leading cam surfaces 83 on the connector lugs 81 to ride upwardly over the contact surfaces 85, into the mounting ring 25 and onto the circular track 60. As the connector lugs 81 reach this position, their lead edges engage the edge 86 of a slot 87 in the lower edge of the spindle 70 (see also FIG. 10). Continued rotation of the filter cartridge results in rotation of the spindle from the no-flow position to the flow position. Further rotation of the spindle past the flow position is prevented by engagement of a stop 88 on the slot edge 86 with the face 90 of a shallow groove 91 formed on the inside of the filter head cylindrical skirt 51 (see FIG. 6). To remove the filter cartridge 11, as for replacement, the free end of the cartridge is grasped by the user and rotated to the left (in the counterclockwise direction), the opposite edges 82 of the connector lugs 81 engage the opposite edges 86 of the slots 87 in the edge of the spindle 70 to cause rotation of the spindle in the same direction to close the valve. When the connector lugs 81 reach the slots 84 in the mounting ring circular track 60, the lugs drop through the slots and the cartridge moves axially out of the filter head and mounting ring.

Figure 9:
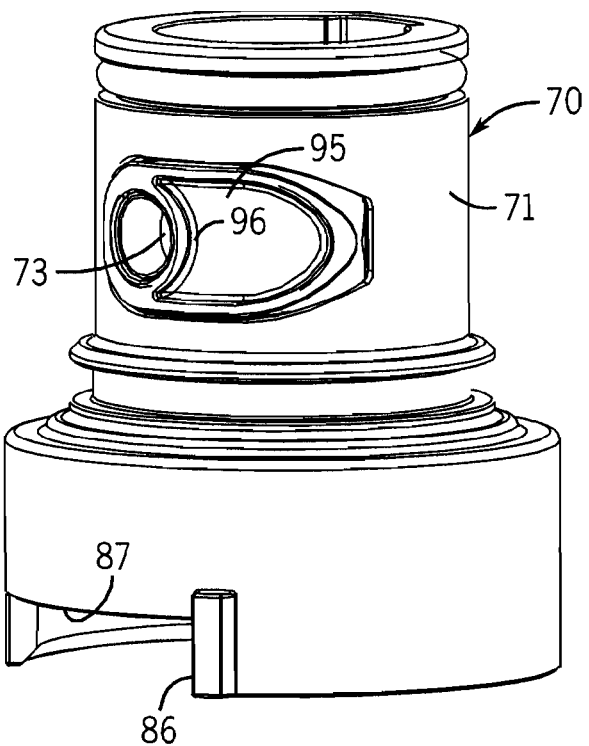
FIG. 9 is a perspective view of the valve spindle shown in FIGS. 6 and 8.
Figure 10:
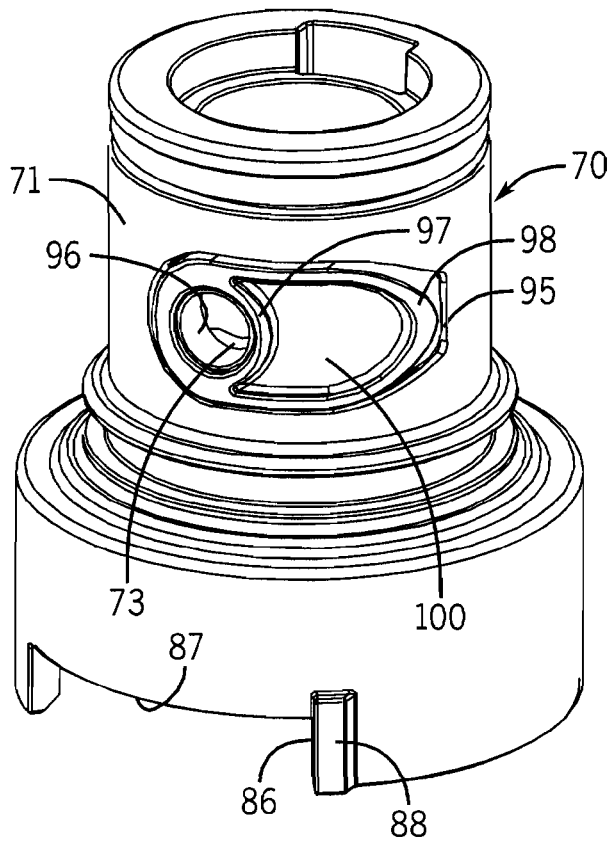
FIG. 10 is a perspective view similar to FIG. 9 and additionally showing the dual function seal.

Referring particularly to FIGS. 6, 9 and 10, the spindle 70 must be provided with a seal arrangement that provides a water tight interface between the outside of the cylindrical body 71 of the spindle and the cylindrical interior wall 66 of the filter head 26. The main sealing interface is provided by an upper O-ring seal 92 and a lower O-ring seal 93. The spindle 70 also provides an important sealing interface between the flow ports 73 in the spindle and the inlet and outlet openings 67 and 68 extending through the cylindrical interior wall 66 of the filter head and the respective inlet and outlet sleeves 48 and 50. A dual function seal 94 is provided for each of the coaxial, diametrically opposed flow ports 73. The seal 94 rests in a recess 95 in the body 71 of the spindle. The flow ports 73 are defined by a sleeve-like nipple 96 that is surrounded by an inner sealing rib 97 on the seal 94 such that when the inner sealing ribs are aligned with the inlet and outlet openings 67 and 68 on the inside of the filter head, flow is enabled between the filter head and the cartridge, as described above. The inner sealing rib 97 bears against the cylindrical interior wall 66 of the head to seal against leakage in the flow position. The inner sealing rib 97 is surrounded by an outer sealing rib 98 and connected thereto by an intermediate web 100 to provide a unitary seal that rests snuggly in the recess 95. A portion of the outer sealing rib may include a part of the inner sealing rib, as shown. When the spindle 70 is rotated to the no-flow position, the outer sealing rib 98 and a portion of the inner sealing rib 97, which together surround the intermediate web 100, surround and cover the inlet and outlet openings 67 and 68 in the cylindrical interior wall of the filter head. The dual function seal 94 is molded from any suitable synthetic rubber sealing material and is provided with a slight curvature to match the spindle body 71 to fit snuggly in the recess 95.

Referring again to FIG. 8B, with the filter cartridge 11 operatively connected to the filter head 26, the flow of water from the inlet sleeve 48, through the flow port 73 in the spindle body, is directed into the cartridge inlet 76 comprising an annular passageway 101 in the cartridge neck 75. The incoming water flows into the space between the filter body 74 interior and the outside of the filter element 78, radially inwardly through the element and into the hollow interior 102 of the element. From the interior of the filter element, the filtered water flows upwardly into the cartridge neck 75, out of an axial outlet passage 103, which comprises the cartridge outlet 77, and into the spindle 70 where it is directed out of the flow port 73 and into the outlet sleeve 50, all as generally shown by the arrows in FIG. 8. In order to eliminate or substantially reduce undesirable leakage from the filter cartridge 11 after it is removed from the filter head and mounting ring, an annular porous disk 104 is placed in the annular inlet passage 101 and a circular porous disk 105 is placed in the axial outlet passage 103. The disks preferably comprise open cell porous polypropylene bodies that are porous enough to not inhibit flow through the system under normal pressure, but which inhibit flow in the absence of pressure, as when the cartridge is removed.

Referring again to FIGS. 6, 8A and 8B, as well as to FIGS. 11 and 12 and 11A and 12A, an arrangement is provided to assure filter cartridge compatibility and operative connection of the cartridge to the filter head. The arrangement may also be utilized to provide a proprietary arrangement for a selected distributor or installer of filter systems in accordance with the teaching of this invention. In one embodiment, an upper adaptor ring 106 is mounted in the spindle 70 and a lower adaptor ring 107 is attached to the neck 75 of the filter cartridge 11. The rings 106 and 107 have complementary interengaging arrangements that assure compatibility of the filter cartridge to the head.

Figure 11:
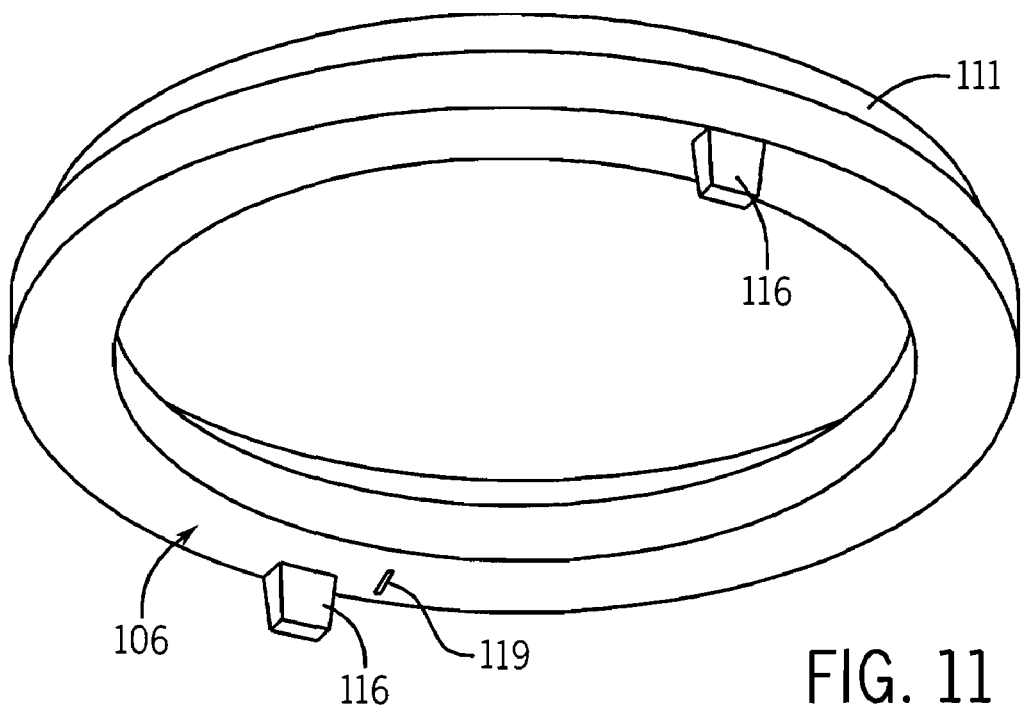
FIGS. 11 and 12 are perspective views of complementary adaptor rings for use in the filter assembly of FIG. 8
Figure 12:
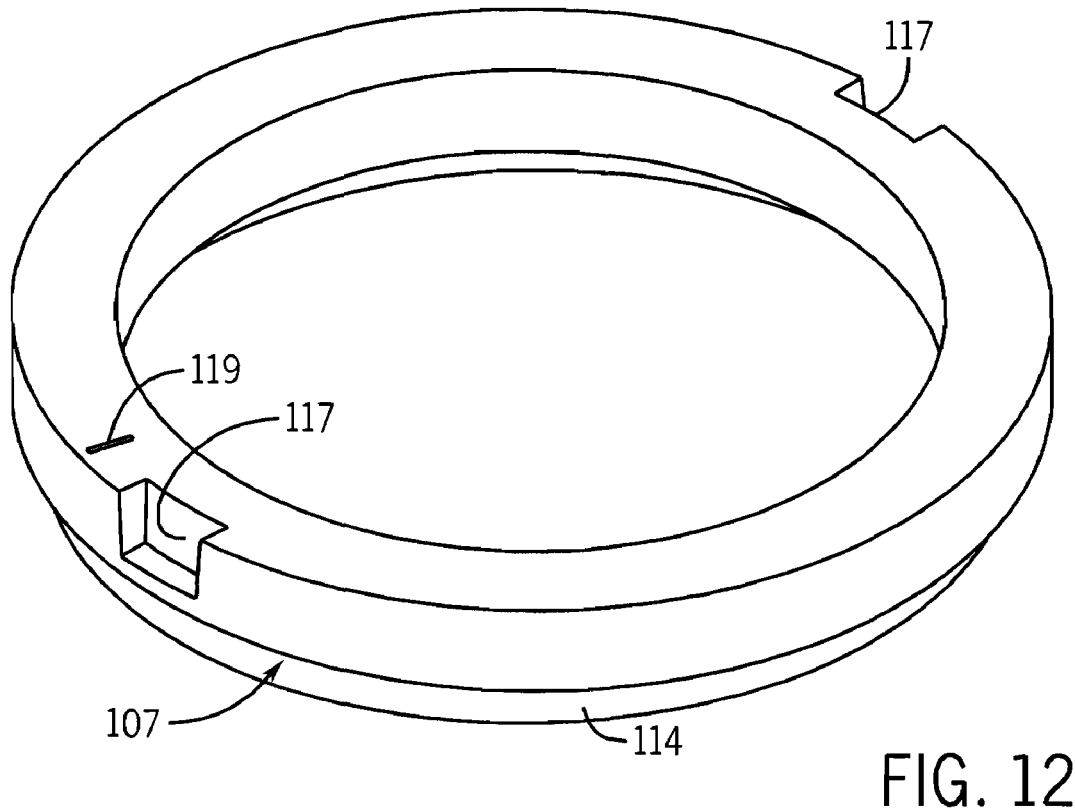
Figure 11A:
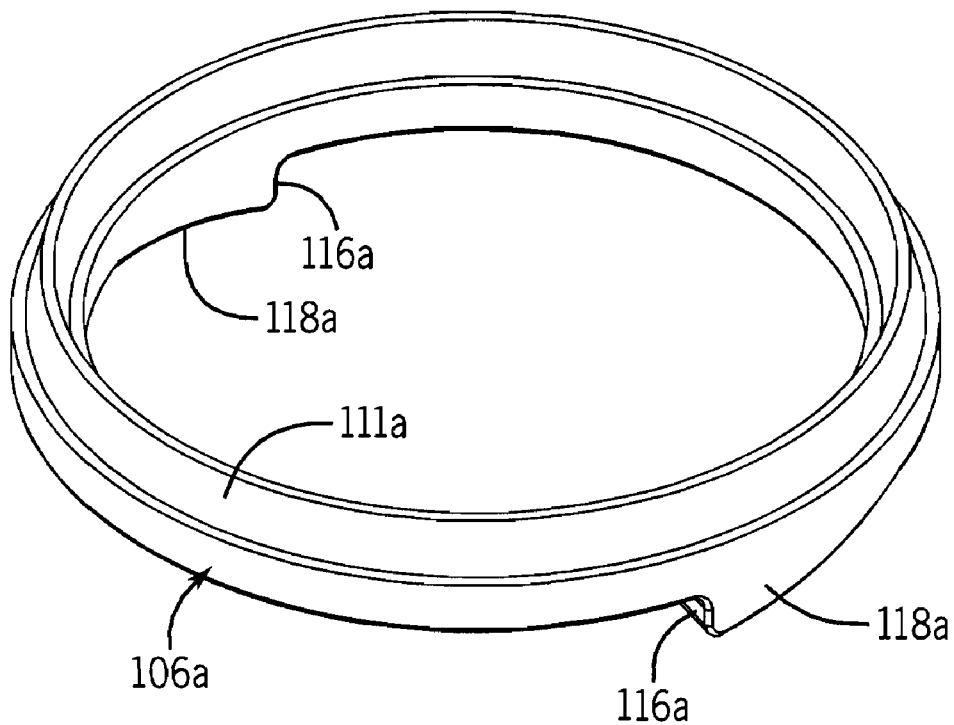
FIGS. 11A and 12A are perspective views of an alternate embodiment of the adaptor rings shown in FIG. 8.
Figure 12A:
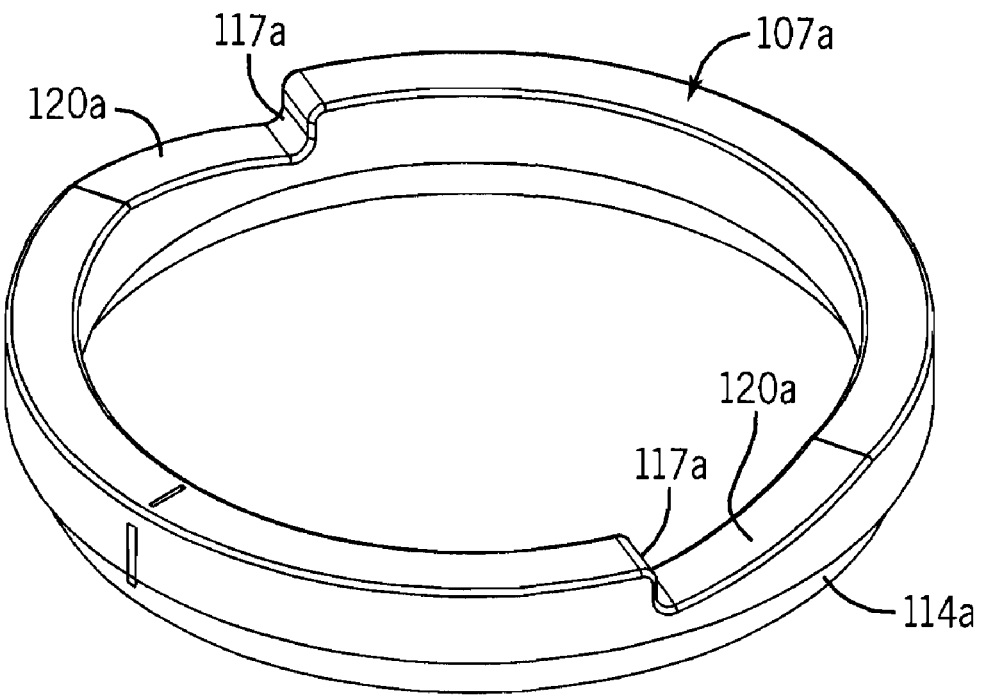

In the embodiment shown in FIGS. 11 and 12, the upper adaptor ring 106 is secured to a shoulder 108 defined by the interface between the upper spindle body 71 and a larger diameter spindle skirt 110. The adaptor ring 106 is provided with an integral weld flange 111 and the mounting shoulder 108 is provided with a complementary weld groove 112. In a similar manner, the lower adaptor ring 107 is mounted on a shoulder 113 on the neck of the cartridge body 74 above the connector lugs 81. The lower adaptor ring 107 has an integral weld flange 114 that seats in a complementary weld groove 115 in the shoulder 113. Both rings 106 and 107 are secured to the respective shoulders 108 and 113 by spin welding, ultrasonic welding or any other suitable welding process. The exposed face of the upper adaptor ring 106 is planar, except for a pair of diametrically opposite axially extending fingers 116. The exposed planar face of the lower adaptor ring 107 has a pair of diametrically opposite recesses 117. The upper and lower adaptor rings are located in circumferentially precise and complementary positions such that relative rotation and axial displacement of the filter cartridge 11 as it is inserted into the spindle 70 results in receipt of the fingers 116 in the recesses 117. The rings 106 and 107, of course, could be reversed on the spindle and the cartridge. Selected circumferential repositioning of complementary upper and lower adaptor rings 106 and 107 may be utilized to provide a proprietary fit for selected customers. To establish a desired position and a proprietary fit, the position of the fingers 117 and recesses 118 can be varied circumferentially, using a locater 119 for the spin welding fixtures. Further, the radial position of the fingers and recesses can be changed together, e.g. to the center or inner edges of the rings to provide a wide range of proprietary fits. Proper engagement of the rings, of course, also assures compatibility of the cartridge with the filter head.

In another embodiment, shown in FIGS. 6, 8A, 8B, 11A and 12A, the upper adaptor ring 106a is secured to the shoulder 108, as described with respect to the previous embodiment. Likewise, the adaptor ring 106a has an integral weld flange 111a and the mounting shoulder 108 is provided with a complementary weld groove 112. Similarly, the lower adaptor ring 107a is mounted on the shoulder 113 on the cartridge body nick about the connector lugs. The lower adaptor ring 107a has an integral weld flange 114a that seats in the complementary weld groove 115 in the shoulder 113. Both rings 106a and 107a may be secured to the respective shoulders 108 and 113 by spin welding (or other suitable welding process). The exposed lower face of the upper adaptor ring 106a is non-planar and defines a pair of diametrically opposite, axially extending abutment faces 116a. Similarly, the exposed upper face of the lower adaptor ring 107a has a pair of diametrically opposite and axially extending abutment faces 117a. As with the previously described embodiment, the upper and lower adaptor rings 106a and 107a are located in circumferentially precise and complementary positions to ensure engagement of the abutment faces 116a and 117a when the cartridge is attached to the filter head and the mounting ring. On the upper adaptor ring 106a, the abutment faces 116a are defined by protrusions 118a on the ring body and, on the lower adaptor ring 107a, the abutment faces 117a are defined by recesses 120a in the ring body.

A presently preferred arrangement for assuring compatibility and operative connection of the cartridge to the filter head is shown in FIGS. 31-36. This arrangement utilizes the same filter head 26 and spindle 70 which together are attached to and carried by mounting ring 25 on the mounting bracket 24. Similarly, the filter head and mounting bracket are designed to accept the standard filter cartridge 11, all as previously described.

Figure 31:
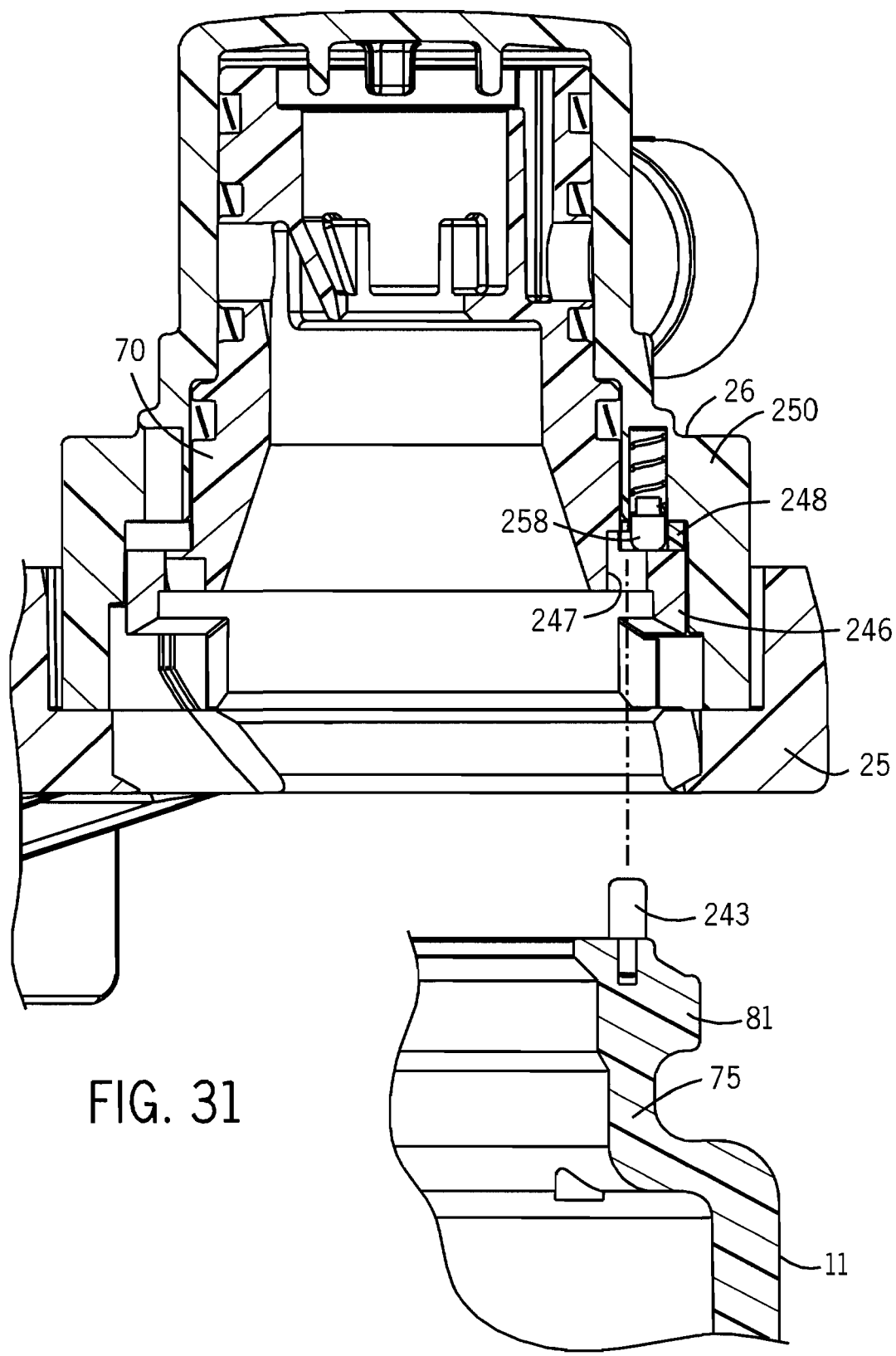
FIG. 31 is a vertical sectional view of another arrangement for assuring filter compatibility and operative connection.

Referring first to FIG. 31, the shoulder or end face 113 on the cartridge neck 75 is provided with a pair of diametrically opposite vertically extending unlocking pins 243. The shoulder 113 may be provided with a circular array of holes 244 into which the reduced diameter ends 245 of the pins may be press fit. For example, if the cartridge shoulder has 14 equally spaced holes 244, diametrically opposite pairs of pins 243 could be placed in seven different circumferential positions.

Alternately, the pins 243 could be formed integrally with and carried on a lower adaptor ring (not shown) similar to the adaptor ring 107a shown in FIG. 8A. The adaptor ring would be attached to the cartridge shoulder 113 by ultrasonic or other welding process, as previously described.

Figure 32:
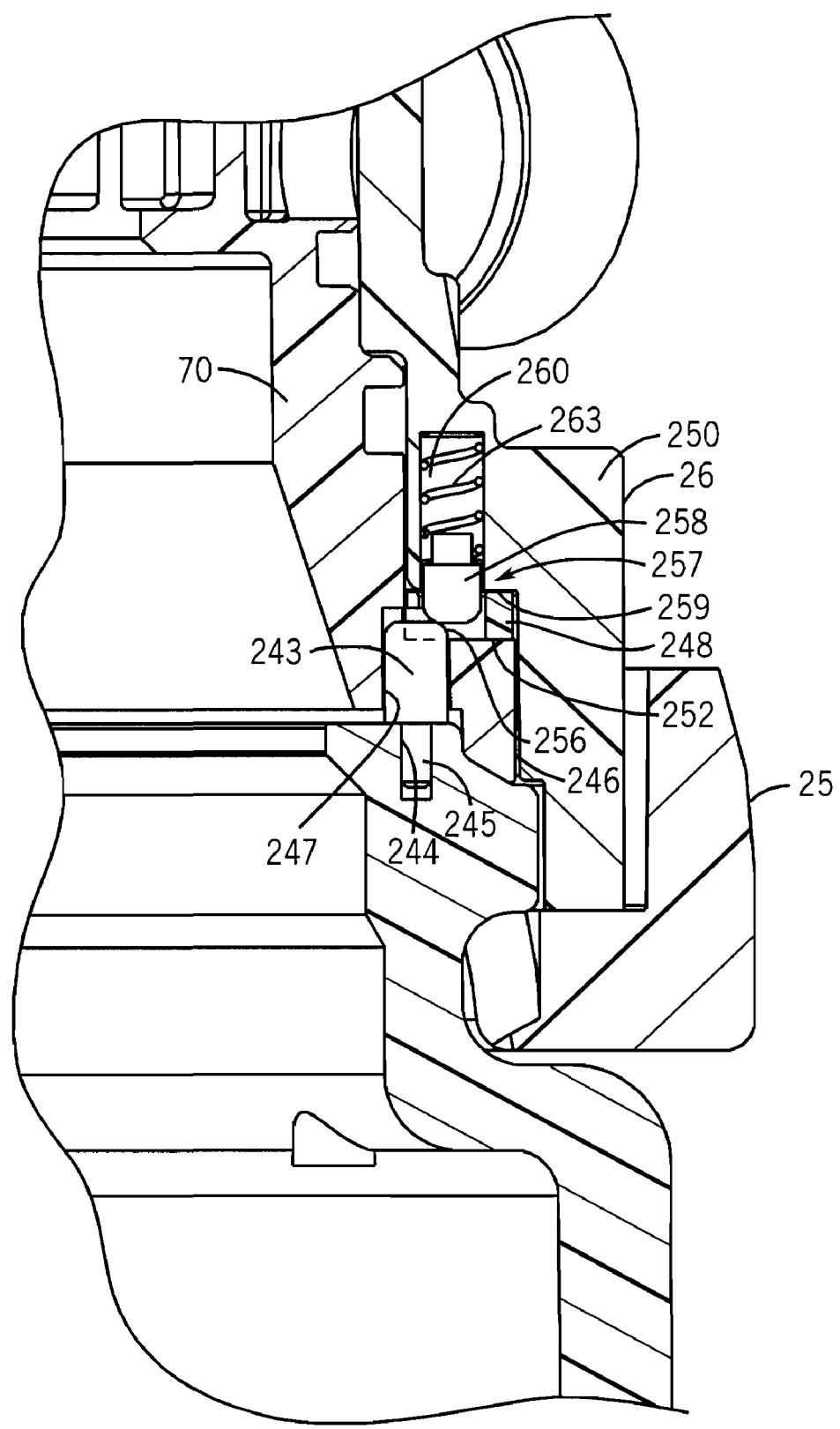
FIG. 32 is an enlarged view of a portion of FIG. 31 showing the unlocking of the spindle from the head.

Referring also to FIG. 32, a lowermost shoulder 246 on the spindle 70 is provided with a pattern of through bores 247 into and through which the pins 243 on the cartridge neck are permitted to pass when attaching the cartridge to the filter head 26. The pattern of through bores 247 matches the pattern of holes 244 for unlocking pins 243.

An upper adaptor ring 248 is captured between shoulder 246 on the spindle 70 and a vertically adjacent shoulder 250 on the filter head 26. The upper adaptor ring 248 has a lower face 252 that is attached to the upper surface of the spindle shoulder 246 in a manner that causes the adaptor ring 248 to rotate with the spindle 70, but is not fixedly attached to the spindle. However, because the ring is captured between the shoulders 246 and 250, the lower face 252 of the adaptor ring may be selectively attached to the spindle shoulder with a diametrically opposed pair of bosses 253 that are received in recesses 254 in the spindle shoulder 246. The recesses 254 are provided in a full circumferential pattern corresponding to the circular pattern of through bores 247 in the spindle.

The adaptor ring 248 has a pair of diametrically opposed through holes 256 into which locking detents 257, in the form of spring biased pins 258 extend. The locking pins 258 are mounted in blind bores 260 in the lower face 259 of the housing shoulder 250. The blind bores 260 are formed in a circular pattern that matches, in number and spacing, the pattern of through bores 247 and the recesses 254 in the spindle shoulder 246. The position of the pair of spring biased pins 258 on the face 259 of the shoulder is selected to correspond to the location of the through holes 256 in the adaptor ring 248 and the location of the pair of pins 243 on the cartridge neck 75. When the locking pins 258 extend through the holes 256 in the upper adaptor ring, as best seen in FIG. 31, the spindle 70 cannot turn axially in the head 26. This, of course, prevents attachment and operative engagement between the filter cartridge and the head.

Figure 34:
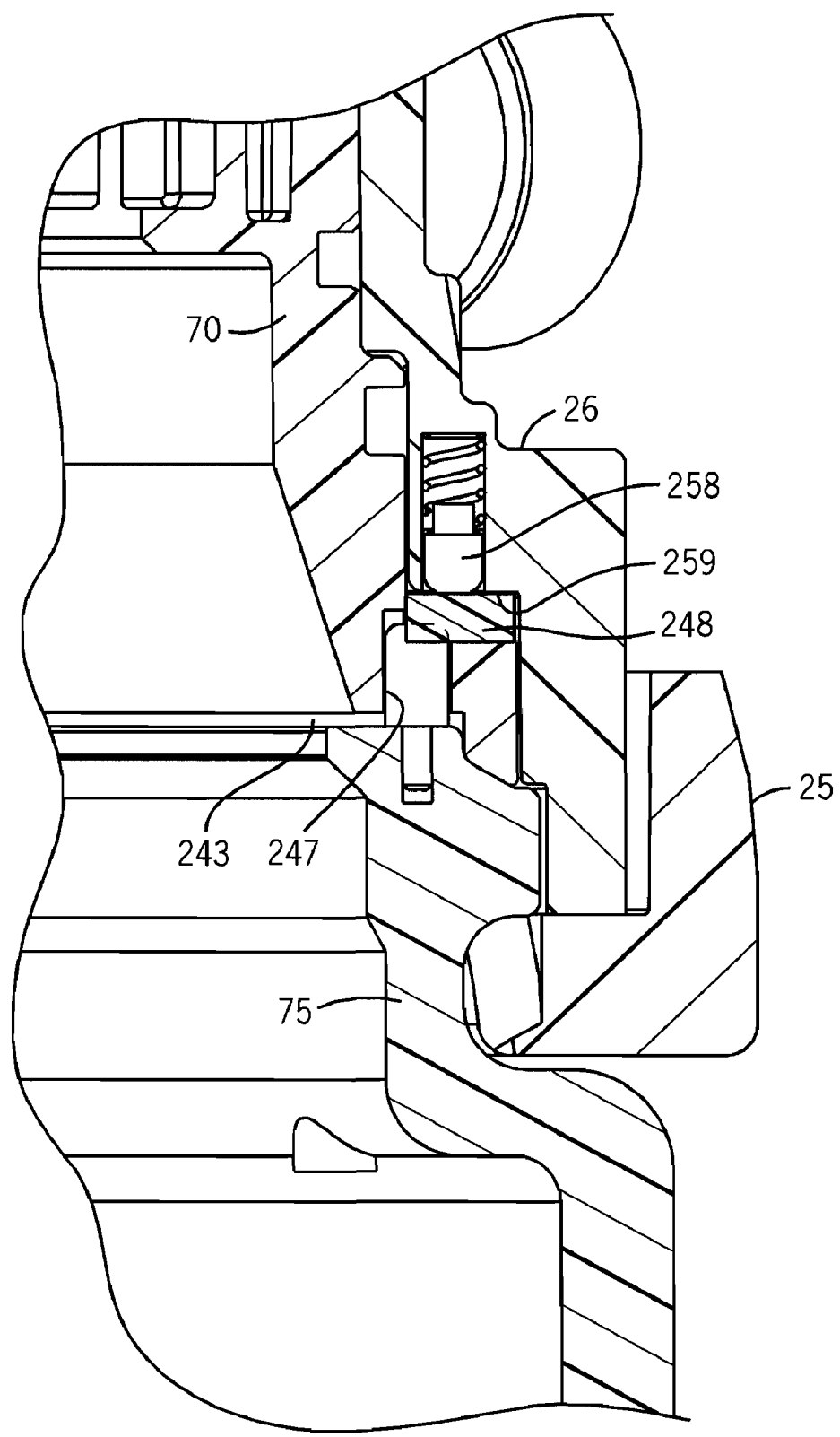
FIG. 34 is a view similar to FIG. 32 showing the fully unlocked position.

FIGS. 31, 32 and 34 show the progression of unlocking the locking pins 258 by insertion of the filter cartridge with the cartridge unlocking pins 243 properly oriented circumferentially to match the adaptor ring holes 256 and the position of the pair of locking pins 258. As the filter cartridge 11 moves vertically through the mounting ring 25 and into the spindle 70, the pins 243 will be received and pass into the through bores 247 in the spindle. Because, as previously explained, connection of the filter cartridge to the spindle and head follows a path of simultaneous rotational and axial movement, the lower surfaces of the through holes 247 are provided with ramp surfaces 261 to permit smooth transition of the pins 243 into and through the bores 247. The ends of the pins 243 pass into relieved areas 262 in the bottom ends of the through holes 256 in the adaptor ring and engage the ends of locking pins 258, forcing the locking pins to move vertically upwardly against the bias of the bias springs 263. Continued axial rotation of the spindle and adaptor ring causes the ring to under ride the ends of the locking pins 258, forcing the pins to ride upwardly over the chamfered edges 264 of the adaptor ring, until the locking pins are fully withdrawn from the holes and ride on the upper surface 255 of the adaptor ring.

To assure compatibility of the cartridge with the filter head and/or to provide a proprietary arrangement for a selected customer or user, circumferential positions of the pins 243 and adaptor ring holes 256, are selected to match the circumferential positions of the blind bores 260 in which the pair of locking pins 258 are mounted. As indicated above, with a pattern of holes 247 in the spindle shoulder 246 of 14 holes, the cartridge pin pair 246 can be matched with the locking pin pair 258 to provide 7 different positions for a proprietary fit. Hole patterns with more or fewer arrangements may be used and, to increase the number of matching fits between the cartridge and the head, the cross sectional shapes of the pins 243 and receiving holes 247 could also be varied.

If one of the filter cartridges 11 is a reverse osmosis (RO) cartridge, such as second cartridge 16 in the filter system 10 shown in FIG. 1, all of the basic elements including the filter head, spindle, mounting ring and cartridge are of different constructions than the corresponding elements in the system described thus far. The need for different size and shape of the parts for an RO system is related to the need to handle three separate flows of water, namely, the inlet water to be treated by membrane separation, the product water or permeate after passage through the membrane, and the brine or retentate carrying the dissolved solids in a relatively high volume of water.

Figure 13:
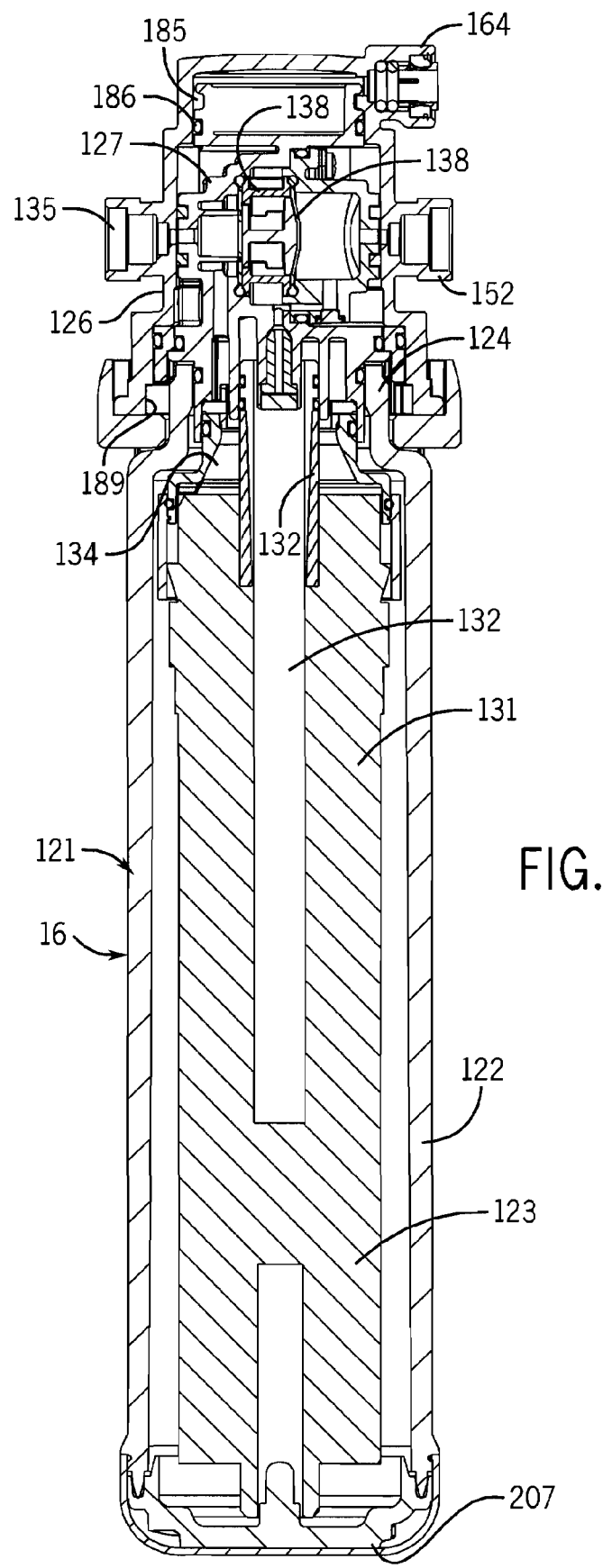
FIG. 13 is a vertical section through an embodiment of the filter system utilizing a reverse osmosis filter cartridge.
Figure 14:
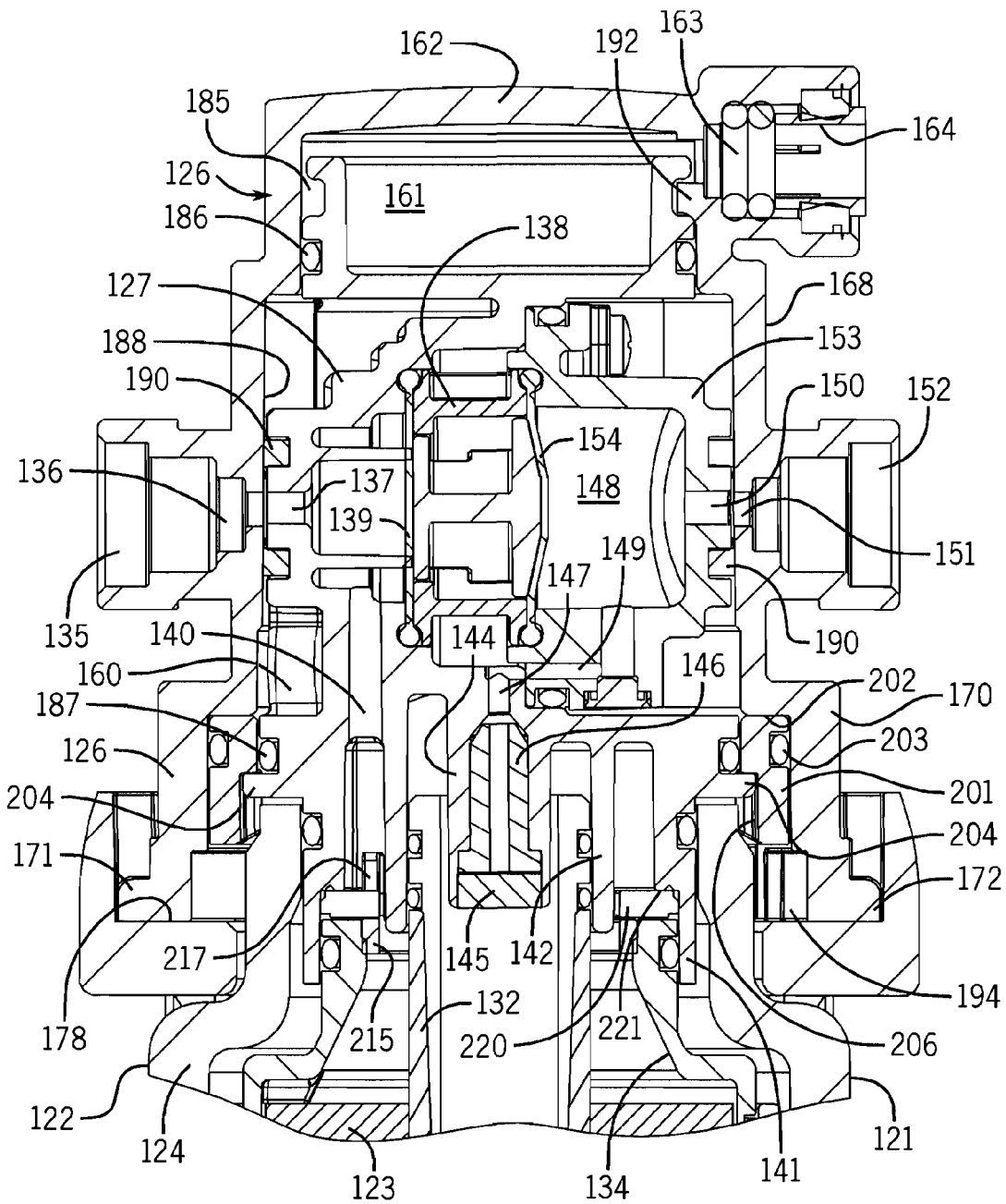
FIG. 14 is an enlarged sectional detail of FIG. 13.

Referring initially to FIGS. 13, 14, and 19, an RO cartridge 121 has a generally cylindrical body 122 carrying a cylindrical filter element 123 and having a neck 124 on one end by which it is fastened to a mounting ring 125 and filter head 126. The filter head 126 carries a valve spindle 127 that provides a flow control function in a manner similar to the spindle 70 of the previously described embodiment. However, the RO spindle 127 also provides a flow path for the brine flow and a control valve for regulating the flow of product water to and from a storage tank.

The RO unit is supported on a mounting bracket 128 with the same rectangular base permitting direct attachment to a modular back plate 18 described above. The mounting bracket 128 also includes the integral mounting ring 125 that provides attachment of the filter head 126 and spindle 127 from above and the demountable attachment of the RO cartridge 121 from below in a manner similar to the mounting arrangement used with the previously described embodiment. However, this filter arrangement also provides for the separate removal of the spindle 127, after removal of the filter cartridge 121, as will be described in greater detail below.

The RO cartridge 121 may be of a generally well known construction, including an interior spirally wound semi-permeable membrane 131 that includes an intermediate separator layer wound around a central hollow product water tube 132. The product water flows radially inwardly, enters the product water tube 132 through holes therein, and then flows vertically upwardly along the interior of the tube and into the RO filter head 126. The brine flow (high volume membrane concentrate of water and dissolved solids) which does not pass through the membrane, flows vertically downwardly and exits the filter element 123 at the bottom end. The volume of brine may comprise as much as 80% of the total incoming flow volume of pre-filtered water, but the proportions may change depending on other changes in system operation.

The upper end of the RO filter element 123 is enclosed with an end cap 134. The end cap 134 functions to help control the flow of water through cartridge 121 and also provides a positioning function to assure proper cartridge fit and function in a manner similar to the previously described embodiment.

Incoming water enters the filter head 126 via an inlet sleeve 135. With the spindle 127 rotated to the open or flow position, incoming water passes from the inlet sleeve 135 through an inlet opening 136 in the wall of the filter head 126, and continues through an inlet 137 in the spindle 127. System pressure acts on one diaphragm of a double diaphragm valve 138, causing it to unseat and to permit incoming water to flow vertically downwardly through an inlet passage 140 and through an opening in the end cap 134 of the filter element 123. The water then passes through the RO filter element 123, as previously described, where it is divided into a product water (permeate) flow and a brine (retentate) flow. These two flows are returned to the filter head via the spindle 127 for further processing as follows.

Figure 15A:
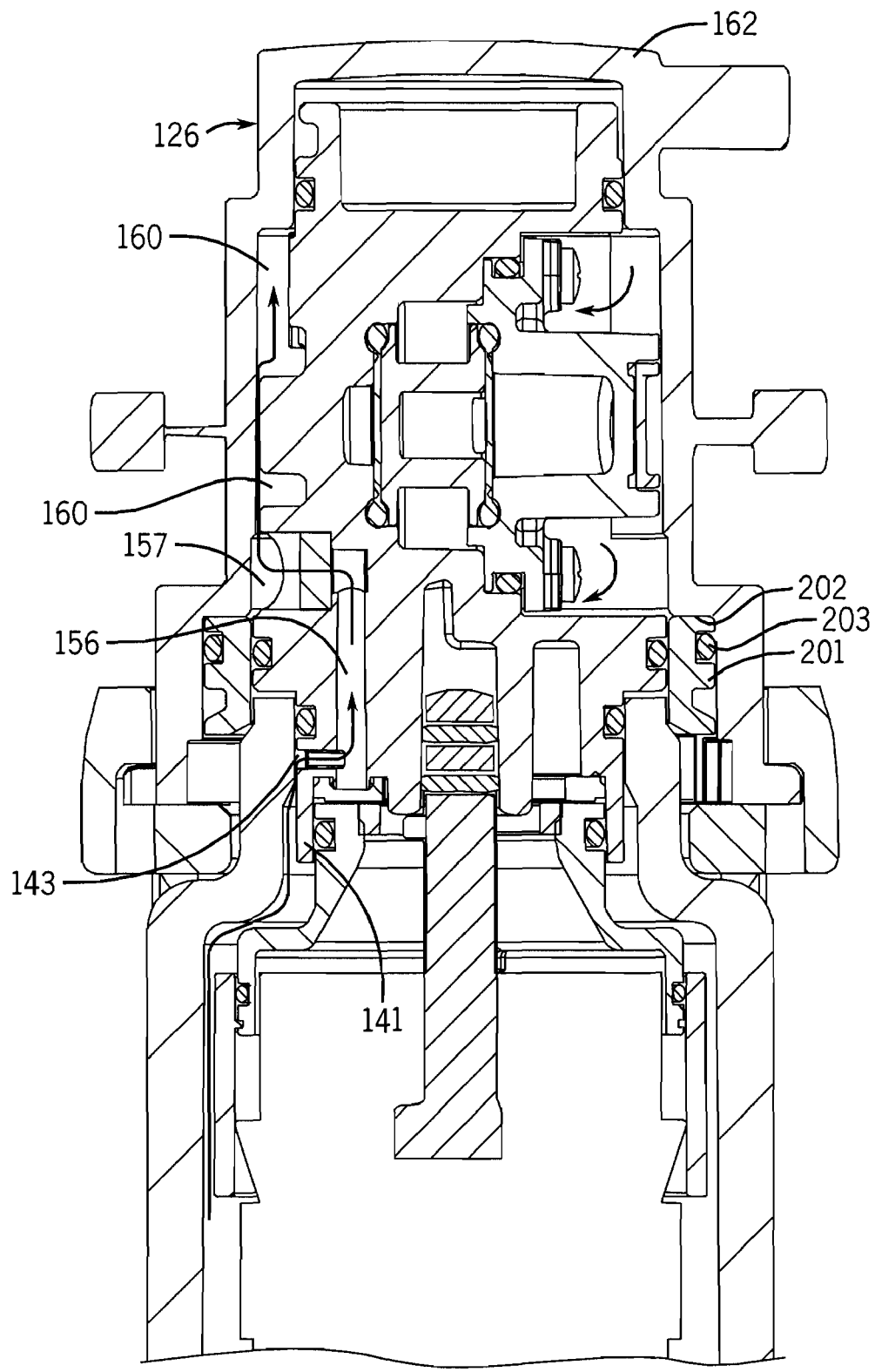
FIGS. 15A, 15B and 15C are enlarged sectional details, similar to FIG. 14, but taken on different rotational vertical planes to show additional elements of the system construction.

Referring particularly to FIG. 14, the lower end of the spindle 127 has a downwardly depending outer skirt 141 that seals against the outside of the cartridge neck 124 and against the inside of end cap 134. An intermediate skirt 142, coaxial with the outer skirt 141, provides a flow channel for water from the inlet 137. A brine flow passage 143 (FIG. 15A) on the outside of the outer skirt 141 provides an inlet to the spindle for brine exiting the filter. The intermediate skirt 142 is sealed on the inside to the outside of the product water tube 132. A spindle inner skirt 144 has, in its lower inlet end, a porous polypropylene disk 145 that provides the same anti-drip function as the disks 104 and 105 described for the prior embodiment. Above the porous disk is a check valve 146 that prevents the back flow of treated product water into the RO cartridge 121, as will be described in great detail below. The product water flows through a vertical product water passage 147, a cross passage 149 in a removable closure plate 153, and then vertically into a chamber 148 in the closure plate 153 where the product water is exposed to the face of the outside diaphragm 154 of the double diaphragm 138. From the chamber 148, the product water flows through an outlet 150 in the closure plate 153, and an outlet opening 151 in the filter head, which opens directly to the outlet sleeve 152.

The higher volume brine flow, passing out of the RO cartridge 121 between the cartridge neck 124 and the outside of the spindle outer skirt 141 passes into the spindle body via the radial passage 143 in the upper portion of the outer skirt 141. The radial passage 143 joins a vertical passage 156 into the spindle body to a second radial passage 157 where the brine flow exits the spindle body and enters a large open area chamber 160 between the spindle body and the inside wall of the filter head 126. The brine flow continues generally vertically to a radial outlet passage 158 where the brine flow exits the large open area and re-enters the spindle body via an outlet passage 158 that communicates with an open upper chamber 161 at the top of the spindle 127. The upper chamber is sealed from the large open brine-containing chamber 160 below and is enclosed by a filter head top cap 162. Brine flow exits the upper chamber 161 via a brine outlet opening 163 in the filter head and an integral brine outlet sleeve 164.

Returning again to FIGS. 13 and 14, the flow of product water exiting the filter head 26 via the outlet sleeve 152 may be directed to a pressurized storage tank in a manner well known in the art. The storage tank typically includes an interior flexible bladder or wall to one side of which the product water flows and on the other side of which is an air space. As product water fills the storage tank and presses against the flexible bladder, the air on the opposite side is compressed and, therefore, the purified product water is stored under pressure. Other means for pressurizing the stored product water are also known. When the pressure in the storage tank reaches a desired level, the storage back pressure acts on the outside diaphragm 154 of the double diaphragm valve 138 to overcome the counter-pressure of pre-filtered inlet flow against the opposite inside diaphragm 139, causing the latter to move against its seat and to shut off the incoming flow from the inlet sleeve 135. As is known in the art, the areas of the respective inside and outside diaphragms 139 and 154 may be chosen to match a desired maximum storage tank pressure to the usual incoming line pressure, e.g. the pressure of the municipal supply of water. With a typical municipal water supply pressure of 60 psi and a desired storage tank pressure of 40 psi, the area of the outside diaphragm 154, exposed to storage tank pressure, would be about two-thirds the area of the inside diaphragm 139, exposed to incoming line pressure.

At about 40 psi of storage tank pressure, the 60 psi inlet line pressure would be overcome and the shut off valve 46 would close.

The radial outlet passage 158 from which brine flows out of the large open chamber 160 between the outside of the spindle and the inside of the filter head 126 is provided with a flow restrictor 165. The flow restricted may be of any convenient construction which will create a brine back pressure sufficient to cause a desired volume of water to be forced through the RO membrane to generate the product water permeate. For example, the restrictor may comprise a ball valve and seat which is slotted to permit a restricted flow of brine past it. Generally, a ratio of brine-to-product water of about 5:1 to 4:1 is desirable. The ratio will vary from initial start up as the increasing permeate back pressure from the pressurized storage tank counters inlet line pressure, thereby reducing permeate flow volume somewhat.

Figure 16:
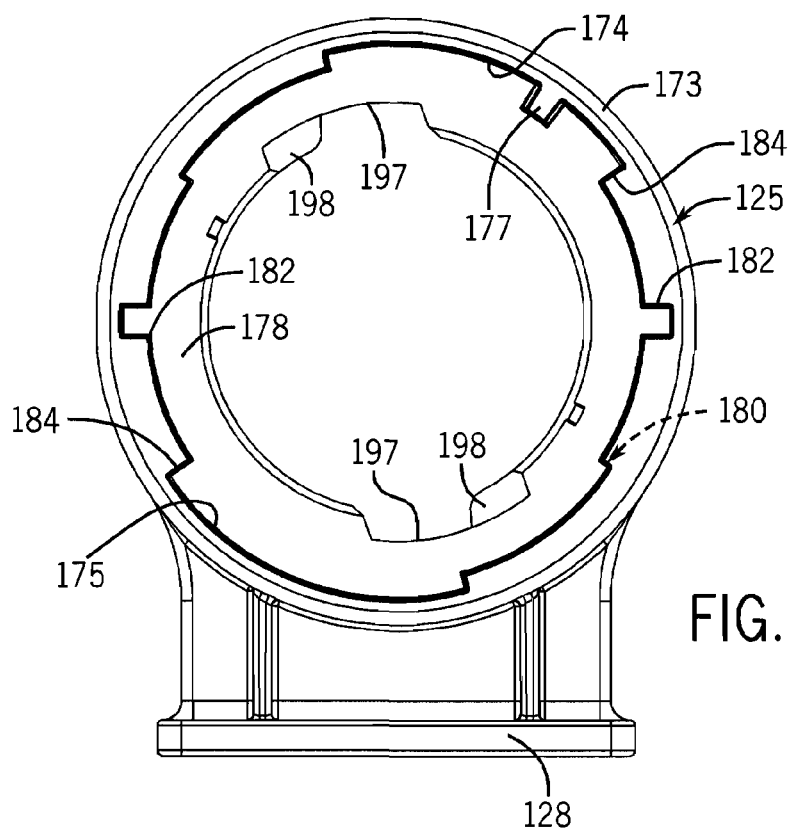
FIG. 16 is a top plan view of the mounting bracket and mounting ring for the system shown in FIG. 13.
Figure 17:
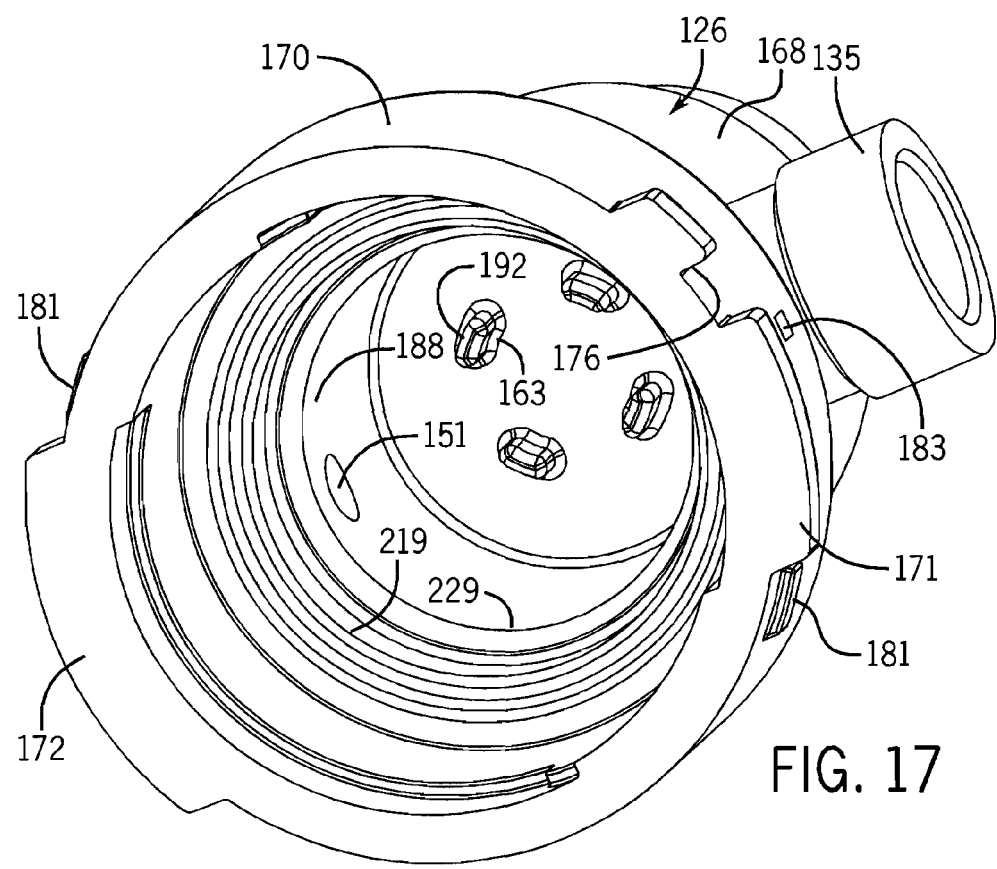
FIG. 17 is a bottom perspective view of the RO filter head used in the FIG. 14 detail.

Referring also to FIGS. 16 and 17, the RO cartridge 121 and RO filter head 126 require a different mounting bracket 128 and integral mounting ring 125 than are used with the previously described filter cartridge 11 and filter head 26. However, the differences are primarily in size and, as will be described, the RO cartridge 121 and associated filter head 126 are attached to the RO mounting ring 125 in substantially the same way. The mounting bracket 128 is attached to the same back plate 18 to provide the modular assembly of a filter system as is the previously described mounting bracket 24.

The RO filter head 126 has an outer housing 168 that includes a cylindrical bottom skirt 170 having an outer diameter larger than the upper portion of the outer housing 168. The lower edge of the cylindrical skirt 170 is provided with a pair of diametrically opposite mounting lugs 171 and 172. The mounting ring 125 has a generally open annular interior, including an outer wall 173 sized to receive the cylindrical bottom skirt 170 of the filter head housing. The upper edge of the mounting ring outer wall 173 includes a pair of inwardly opening slots 174 and 175, respectively, for receipt of the mounting lugs 171 and 172. Mounting lug 171, which is positioned below the inlet sleeve 135, is provided with an open gap 176. The slot 174 in the mounting ring outer wall 173 has a protrusion 177 that is sized to move axially through the gap 176 as the housing cylindrical skirt 170 moves axially into the mounting ring 125. The opposite mounting lug 172 has no gap and the corresponding slot 175 does not have a protrusion. As a result, the filter head 126 can only be inserted into the mounting ring at one circumferential position. As the cylindrical bottom skirt 170 of the filter head drops through the slots, the lower edge comes to rest on a circular track 178 on the interior of the mounting ring. The track 178 defines the bottom of an annular slot 180 having a height just larger than the thickness of the mounting lugs 171 and 172, such that when the filter head is rotated on the circular track 178, the lugs 171 and 172 pass into the annular slot 180 until the filter head is in the operative position with the axis of the coaxial inlet and outlet sleeves 135 and 152 parallel to the mounting bracket 128. In this operative position, a pair of diametrically opposite stop detents 181 on the outer surface of the cylindrical skirt 170 engage respective first stops 182 in the circular track 178 to prevent reverse rotation and establish the operative position of the filter head. Further, a pair of diametrically opposite locking detents 183 on the cylindrical skirt 170 immediately above the mounting lugs 171 and 172 engage respective second stops 184 on the circular track to prevent continued rotation of the filter head and to lock it in its operative position. Preferably, the stop detents 181 have ramped surfaces permitting them to ride along the circular track 178 under the force of manual rotation of the filter head in the mounting ring until the stop detents 181 snap into engagement with their respective stops 182. In this position, the locking detents 183 reach and simultaneously engage the second stops 184 establishing the locked operative position of the filter head.

The RO filter head 126 is made to permit removal of the spindle 127 in the event it is necessary to replace the double diaphragm shut off valve 138. The following comments describe first how the RO spindle 127 is mounted in the filter head 126 and how the RO filter cartridge 121 is attached to the mounting ring 125 and operatively connected to the filter head and spindle. The upper end of the spindle 127 is provided with an annular locking groove 185 (see FIGS. 13 and 14) positioned immediately above an upper O-ring seal 186 that seals the upper chamber 161 from the large open area chamber 160 below. Similarly, a lower O-ring seal 187 provides a sealed interface between the spindle and the interior of the filter head 126, thereby sealing the vertical chamber 160 surrounding the spindle 127. That chamber also includes the water inlet 137 and the axially aligned outlet 150, the latter of which, as described above, is actually formed in the closure plate 153. The body of the spindle 127 is provided with a seal arrangement that creates a water tight interface between the spindle body and the cylindrical interior wall 188 of the filter head 126. In addition to the upper and lower O-ring seals 186 and 187, the sealed interface includes a dual function seal 190 for each of the inlet 137 and outlet 150 in the spindle and the corresponding respective inlet opening 136 and outlet opening 151 in the filter head 126. The dual function seal 190 is similar in construction and function to the seal 94 (see FIG. 10) used in the previously described embodiment. Thus, the dual function seal 190 rotates with the spindle 127 between a flow position, wherein flow is enabled between the filter head and the cartridge as described above, and a no-flow position, wherein flow is halted. In both positions, the dual function seal separates the brine flow through the filter head and spindle from the flows of incoming water and product water.

Figure 20:
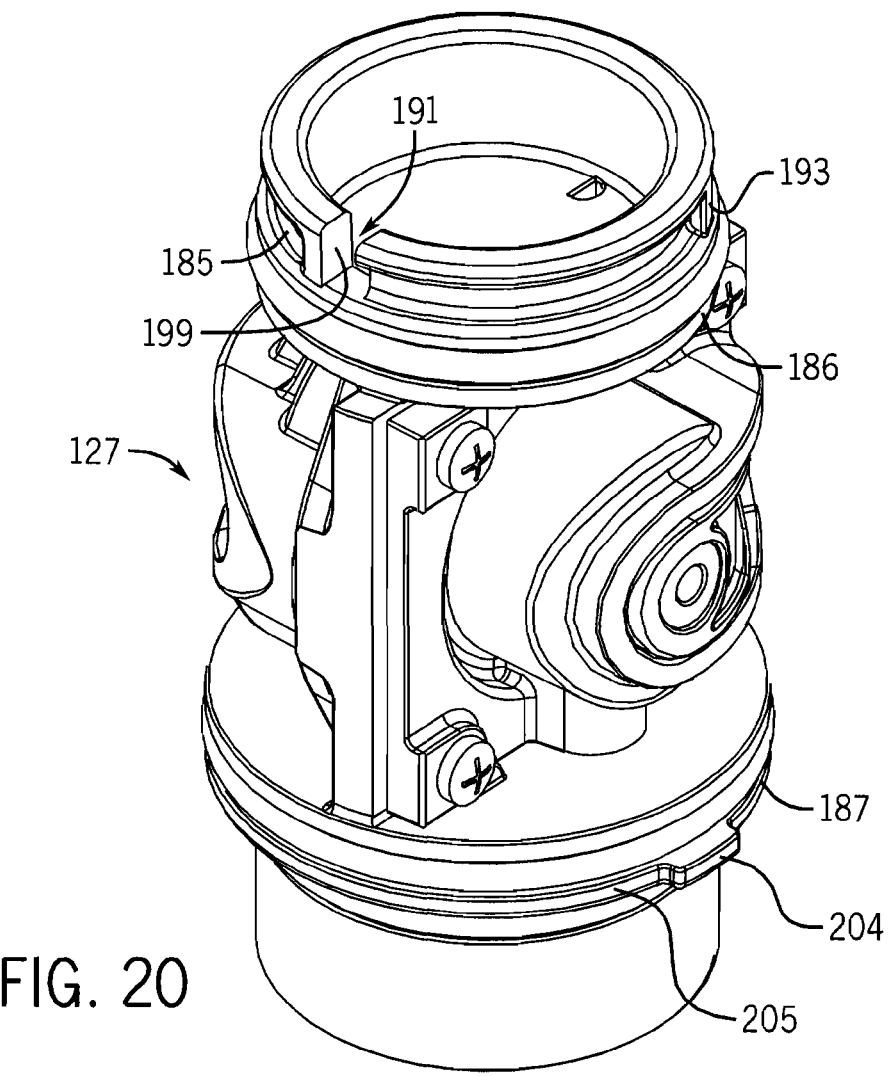
FIG. 20 is a perspective view of the valve spindle shown in FIGS. 14, 15A and 15B.

Because the spindle 127 is designed to be removable for replacement of the diaphragm shut off valve 138, it is possible to mount the filter head 126 to the mounting ring 125 with or without the spindle in place in the filter head. With the filter head 126 mounted in operative position to the mounting ring 125, as described above, the spindle 127 is inserted axially from below through the mounting ring 125 and into the filter head 126. Referring also to FIG. 20, the annular locking groove 185 in the upper end of the spindle is provided with an open notch 191 sized to receive a lug 192 on the inside wall of the filter head 126 just below the brine outlet opening 163. Receipt of the lug 192 in the notch 191 permits the spindle to be fully inserted and the lug 192 aligned with the annular locking groove 185. Rotation of the spindle causes the locking groove to enclose the lug such that the spindle is restrained from axial movement out of the filter head. The spindle may be rotated with respect to the head and the lug 192 until the lug engages a stop 193 in the locking groove 185 after about 120° of rotation. This places the spindle rotationally in the no-flow position whereupon the system water may be turned on to permit operation.

Figure 15B:
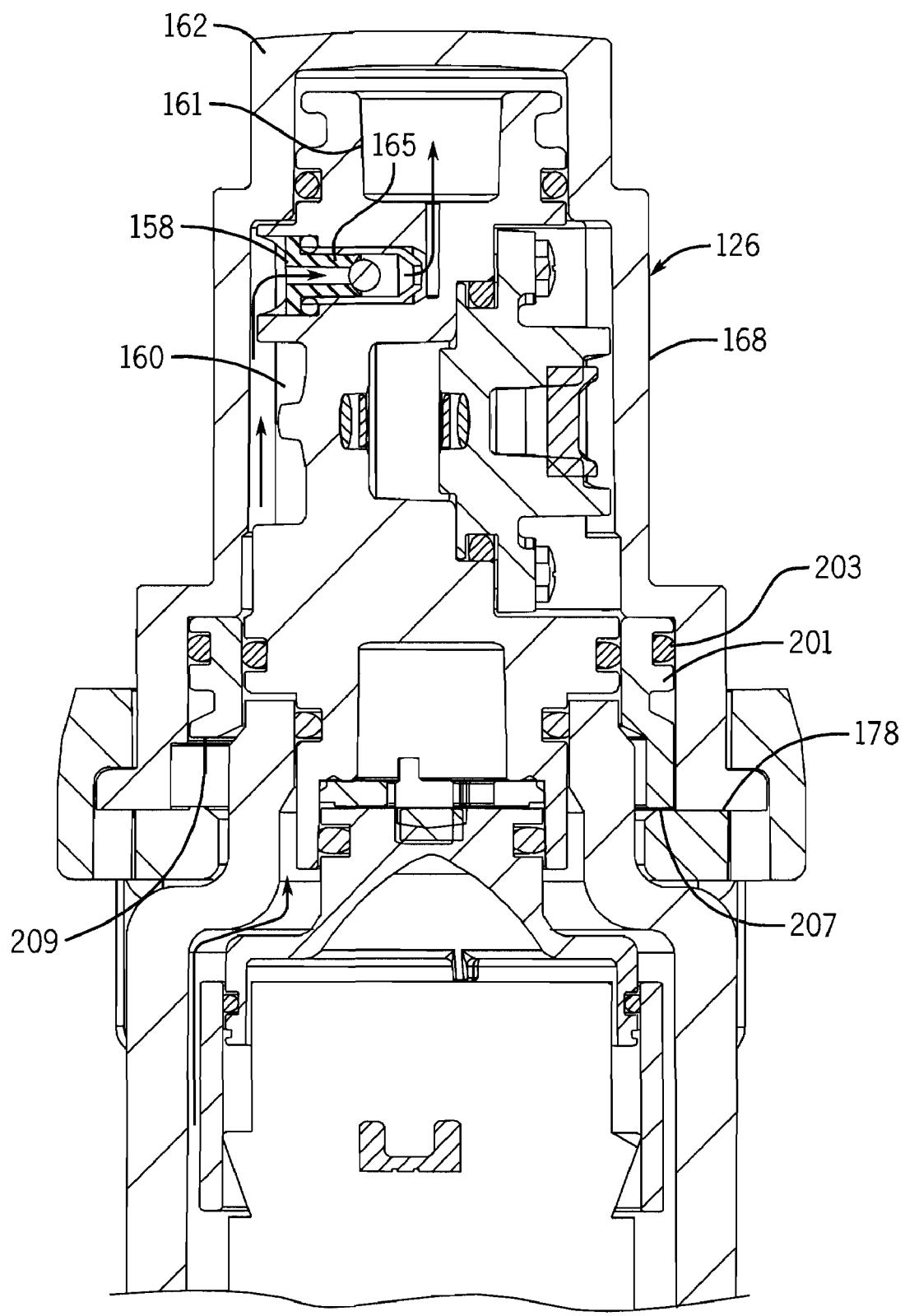
Figure 21:
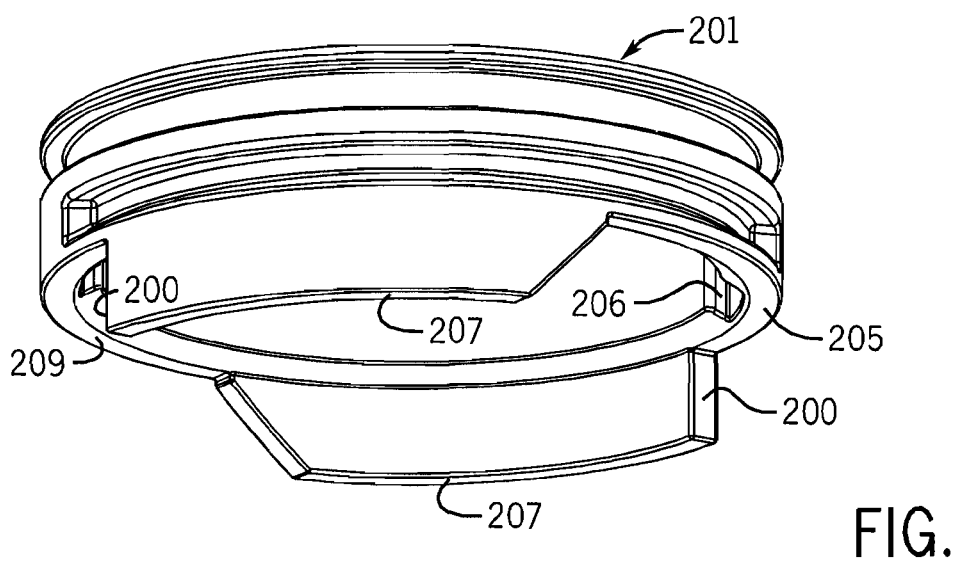
FIG. 21 is an enlarged perspective view of the spindle drive ring shown in FIGS. 14, 15A and 15B.
Figure 22:
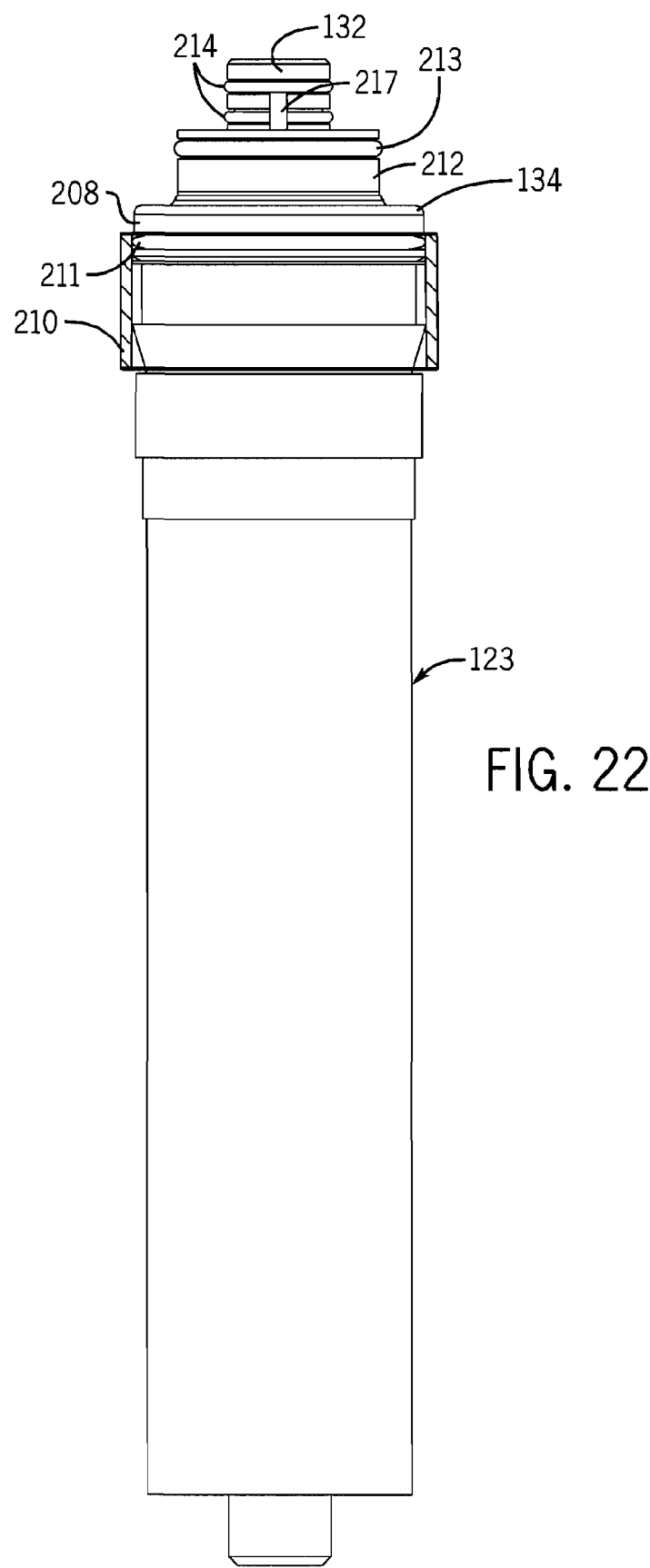
FIG. 22 is an elevation view of the RO filter element.
Figure 23:
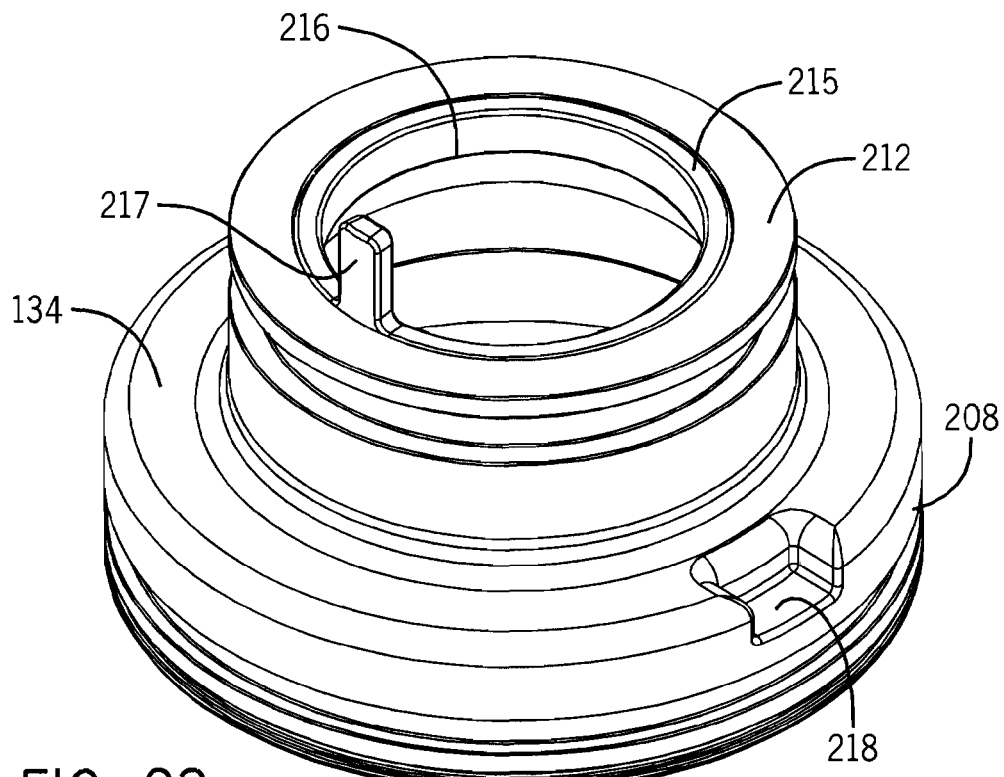
FIG. 23 is a perspective view of the end cap for the filter element shown in FIG. 22.
Figure 24:
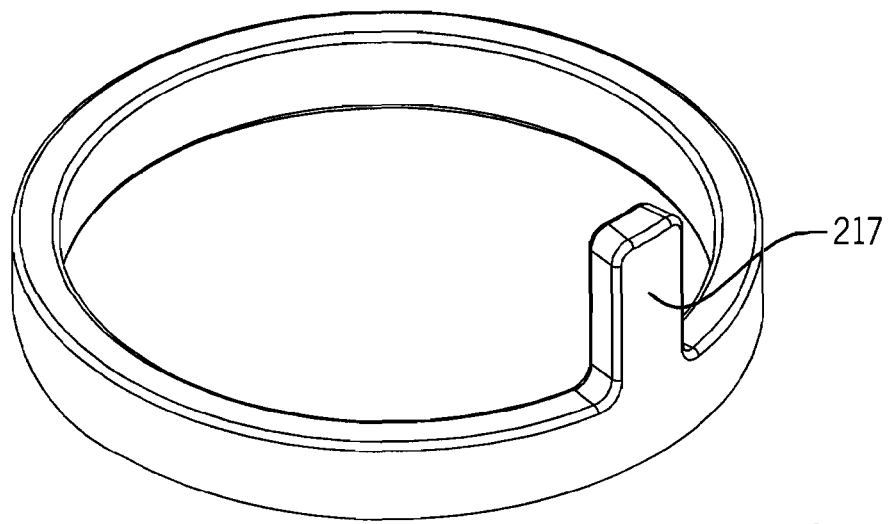
FIG. 24 is a perspective view of the adaptor ring for the filter element shown in FIG. 22.
Figure 25:
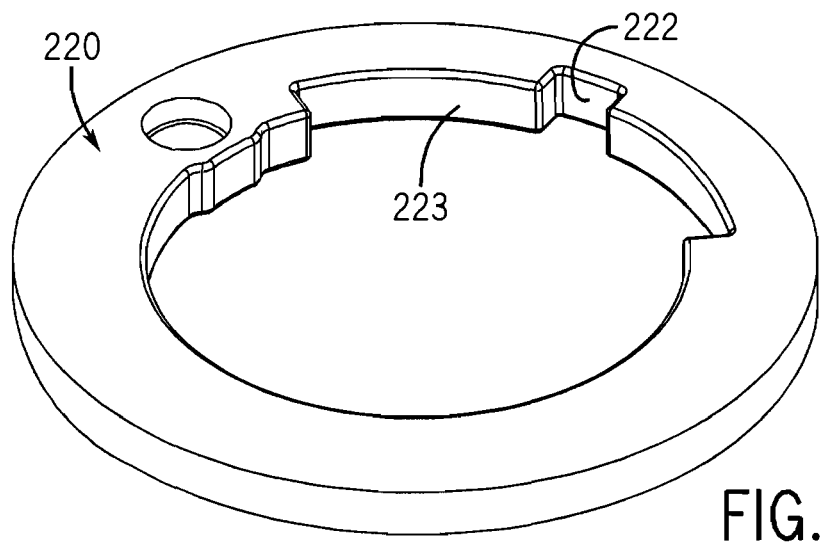
FIG. 25 is a perspective view of the adaptor ring for the spindle shown in FIG. 20.
Figure 26:
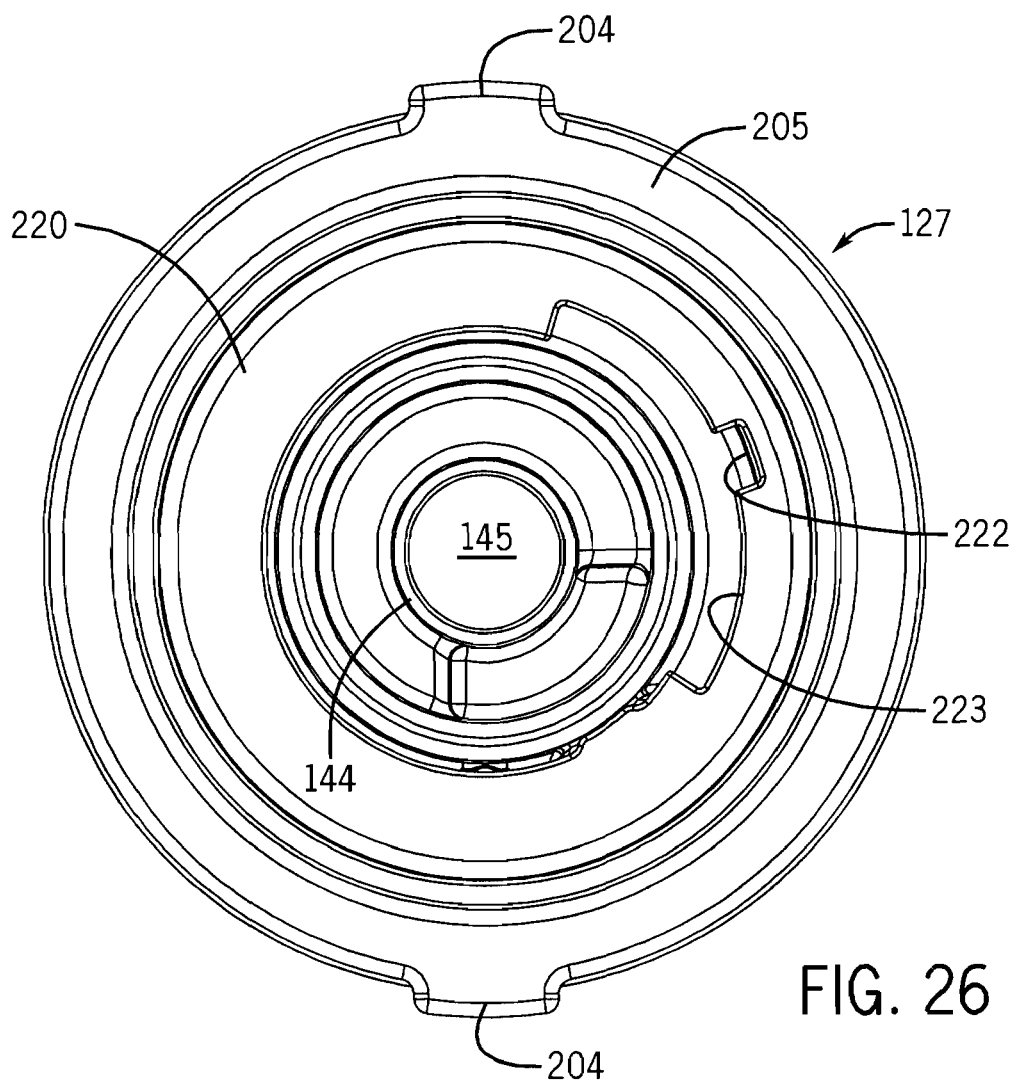
FIG. 26 is a bottom plan view of the spindle shown in FIG. 20.

Referring also to FIGS. 16-18, the neck 124 of the RO cartridge 121 is provided with a pair of diametrically opposed connector lugs 194, similar to the connector lugs 81 (see FIG. 8A) of the previously described embodiment. The connector lugs 194 have a parallelogram shape in cross section defined by narrow leading and trailing edges 195, in the rotational direction, that define cam surfaces 196. The circular track 178 in the outer wall 173 of the mounting ring 125 has a pair of diametrically opposed slots 197, each of which has angled contact surfaces 198 that define openings through which the connector lugs 194 on the filter cartridge neck may pass. As the filter cartridge neck is inserted axially into the mounting ring and spindle, simultaneous rotation of the cartridge to the right (clockwise direction) permits the leading cam surfaces 196 on the connector lugs to ride upwardly over the contact surfaces 198, into the mounting ring 125 and onto the circular track 178. As the connector lugs reach this position, their lead edges engages the vertical drive faces 200 of a rotatable spindle drive ring 201 (FIG. 21) that is captured in the interface between the filter head outer housing 168, the mounting ring 125 and the spindle 127. More particularly, and referring also to FIGS. 14, 15A and 15B, the spindle drive ring 201 rests on an annular shoulder 202 on the cylindrical interior wall 188 of the filter head 126. The drive ring 201 carries an upper O-ring seal 203 that seals against the cylindrical inner wall 188 of the filter head. The interface between the drive ring and the spindle is sealed by the lower O-ring seal 187. A lower flange 205 on the spindle that defines one wall of the groove carrying the lower O-ring seal 187 is provided with a pair of diametrically opposite drive tabs 204 (FIGS. 20 and 26). With the drive ring 201 seated on the shoulder 202, insertion of the spindle through the drive ring and into the filter head permits the drive tabs 204 to drop into shallow notches 206 in the interior of the drive ring. If necessary, continued rotation of the spindle and the drive ring will permit the notch 191 in the annular locking groove 185 at the upper end of the spindle to engage the lug 192 on the interior of the filter head to establish the proper axial position of the spindle within the head and the drive tabs 204 to seat fully in the notches 206. From this position, axial rotation of the spindle and drive ring in the counterclockwise direction (clockwise rotation is prevented by stop wall 199 in the locking groove 185 at one side of the notch 191) permits the annular locking groove 185 in which the lug 192 is seated to move relative to the lug until the lug reaches the stop 193 in the groove 185 after about 120° of rotation. At this position, the spindle is in the no-flow position and the supply of water may be turned on. As the filter cartridge 121 is inserted vertically through the tapered slots 197 in the mounting ring 125 and onto the circular track 178, the lead edges of the lugs will engage the vertical drive faces 200 on the spindle drive ring to cause rotation of the spindle from the no-flow to the flow position. Continued movement in the clockwise direction is prevented by engagement of the lead edges 195 of the connector lugs 194 with recessed stops 189 inside of the bottom edge of the filter head bottom skirt 170. In this position, the lowermost edges 207 of the spindle drive ring 201 rest on the circular track 178 and the recessed edges 209 rest on the top surfaces of the cartridge connector lugs 194.

Figure 15C:
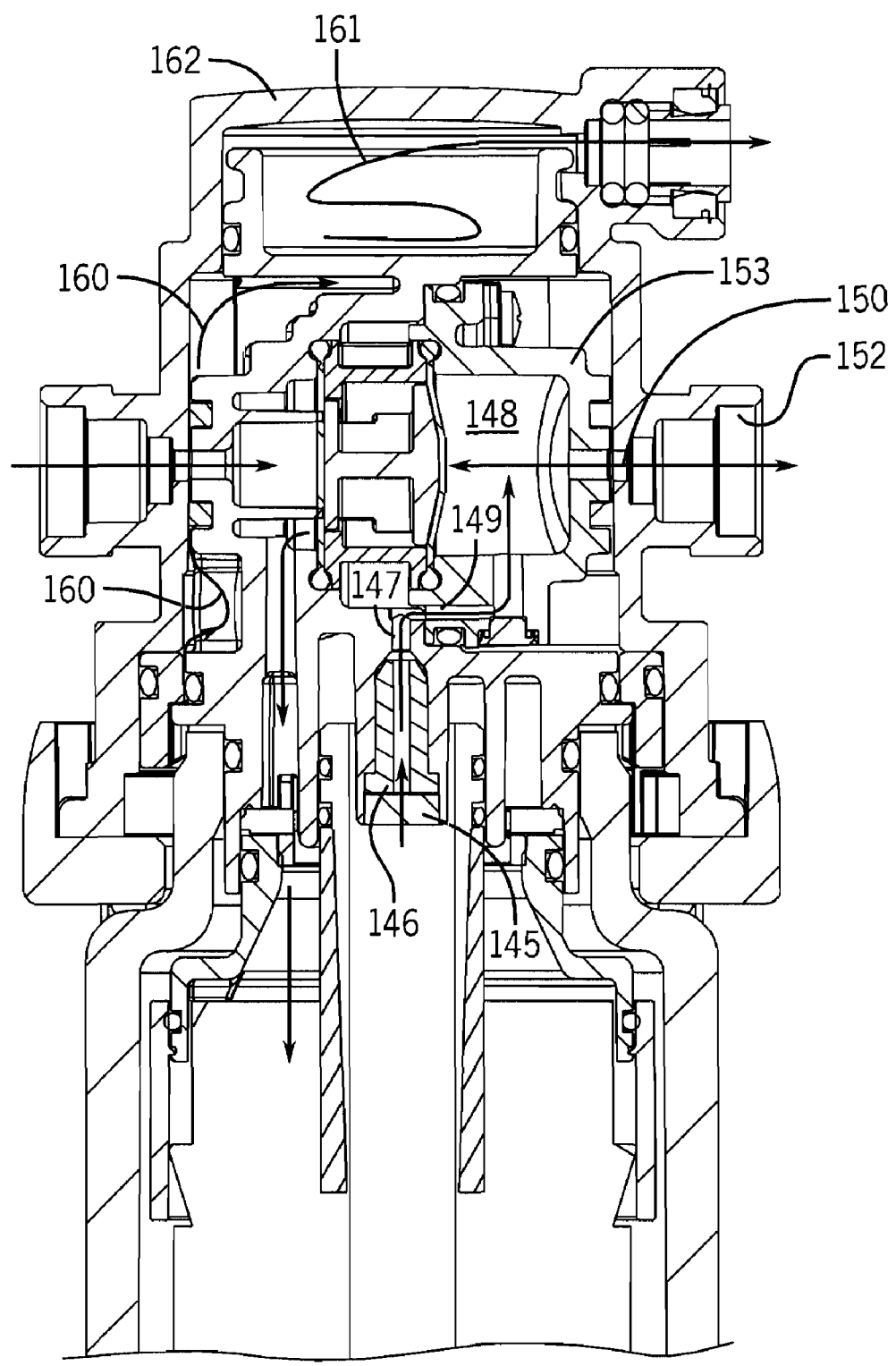

Referring again to FIGS. 13, 15A and 15C, as well as FIGS. 22-25, the RO filter cartridge 121 contains the filter element 123 that is inserted through the open bottom end of the cartridge body 122 and held in place with a lower enclosing end cap 207. The upper end of the filter element 123 is closed by the end cap 134 that has an outer flange 208 that is seated in the upper end of a brine ring 210 and sealed therein with an O-ring seal 211. The upper end of the end cap 134 has a narrower neck 212, the outside of which seats an upper O-ring 213 that provides sealing contact with the inside of the outer skirt 141 of the spindle 127 when the cartridge is inserted through the mounting ring and into the filter head. The O-ring seals 211 and 213 preclude brine water from mixing with the incoming water and product water, and assure that the brine flow is directed to the brine flow passage 143 in the spindle outer skirt 141. Separation of the incoming water flow from the product water flow is accomplished by a double O-ring seal 214 carried on the product water tube 132 that engages the inside surface of the spindle inner skirt 144.

The RO cartridge 121 and valve spindle 127 include a locator arrangement, similar to that used in the previously described embodiment, to assure filter cartridge compatibility and operative connection of the cartridge 121 to the filter head 126. This arrangement may also be utilized to provide a proprietary filter assembly for a selected distributor or dealer, as also previously described above.

A lower adaptor ring 215 (FIGS. 23 and 24) seats on an interior shoulder 216 on the inside of the neck 212 of the end cap 134. The ring 215 has an integral finger 217 extending perpendicular to the plane of the ring. The ring may be secured on the interior shoulder 216 by spin welding, ultrasonic welding or other suitable fastening process. The end cap outer flange 208 is provided with a locator notch 218. Upon assembly of the filter element 123 into the cartridge body 122, the locator notch 218 is positioned to engage a matching protrusion on the inside of the neck 124 of the filter cartridge body. This assures proper circumferential location of the finger 217. A complementary upper adaptor ring 220 (FIGS. 25 and 26) is seated on a shoulder 221 on the inside of the spindle outer skirt 141. The inside edge of the upper adaptor ring 220 is provided with a circumferentially extending cutout 223 which, in turn, has a centered notch 222 that is sized to receive the finger 217 extending from the lower adaptor ring 215. The upper adaptor ring 220 may also be affixed on the shoulder 221 by spin welding or other suitable plastic welding process that positions the notch 222 such that, when the cartridge is attached to the filter head with the spindle 127 in the locked off position, the finger 217 will engage the notch 222. By adjusting the circumferential positions of the finger 217 and the notch 222. By accurate control of the welding process, a number of proprietary adaptor ring positions may be provided that can be used to offer a customer a proprietary product.

Referring particularly to FIGS. 13, 26 and 27, when it is desired to remove the spindle 127 to, for example, replace the diaphragm valve 138, it has been found that the many sealed interfaces between the spindle and the head 126 make it difficult to remove the spindle. To facilitate spindle removal, a special spindle removal tool 224, as shown in FIG. 27, may be used. After the RO cartridge 121 has been removed and the source of water has been shut off, the removal tool 224 is inserted into the spindle with the inner spindle skirt 144 received in the hollow interior of the tool body 225. A curved offset 226 on the inner end of the tool body is sized to fit into the cutout 223 in the adaptor ring 220. When the curved offset 226 is centered in the cutout, engagement lug 227 at the end of the offset 226 will pass through the notch 222 in the cutout 223. Slight rotation of the tool in either direction will cause the engagement lug 227 to move out of alignment with the notch 222 and to engage the underside of the ring 220. The user may then pull axially on the tool handle 228, after first rotating the tool in the "on" direction to permit the retaining lug 192 in the upper part of the filter head 126 to pass through the notch 191 in the locking groove 185.

To further facilitate removal of the spindle 127 from the filter head 126, and referring also to FIG. 17, a large portion of the cylindrical interior wall 188 of the filter head has a recessed cylindrical surface 229 that has a larger diameter than the sealing surfaces 219 that make sealing contact with the dual function seal 190. When the spindle is rotated to the removal position, dual function seals 190 will engage the recessed surface where the force necessary to remove the spindle is substantially reduced.

Figure 29:
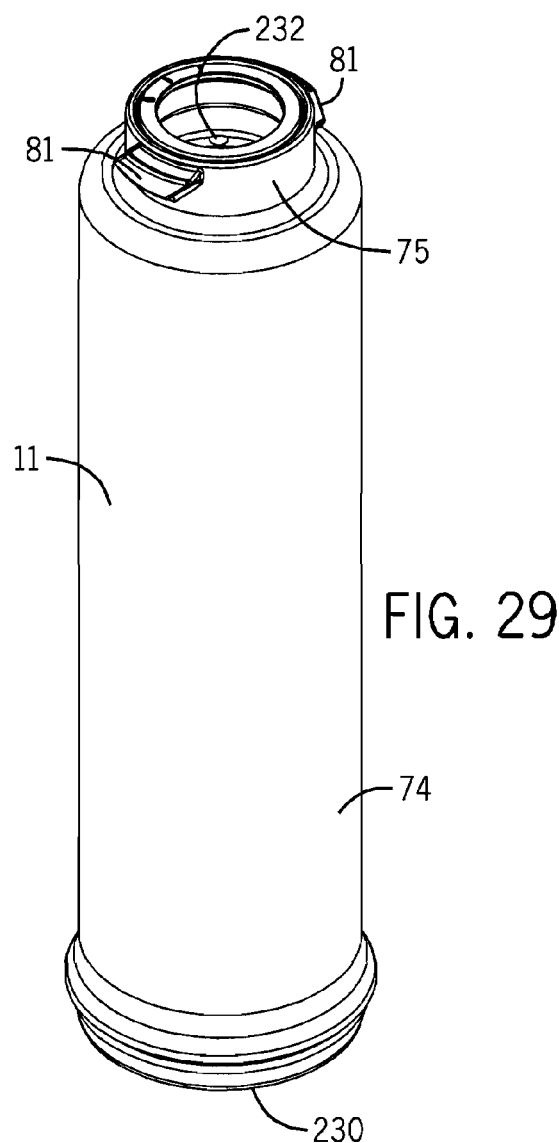
FIG. 29 is a perspective view of the housing for the element shown in FIG. 28.
Figure 30:
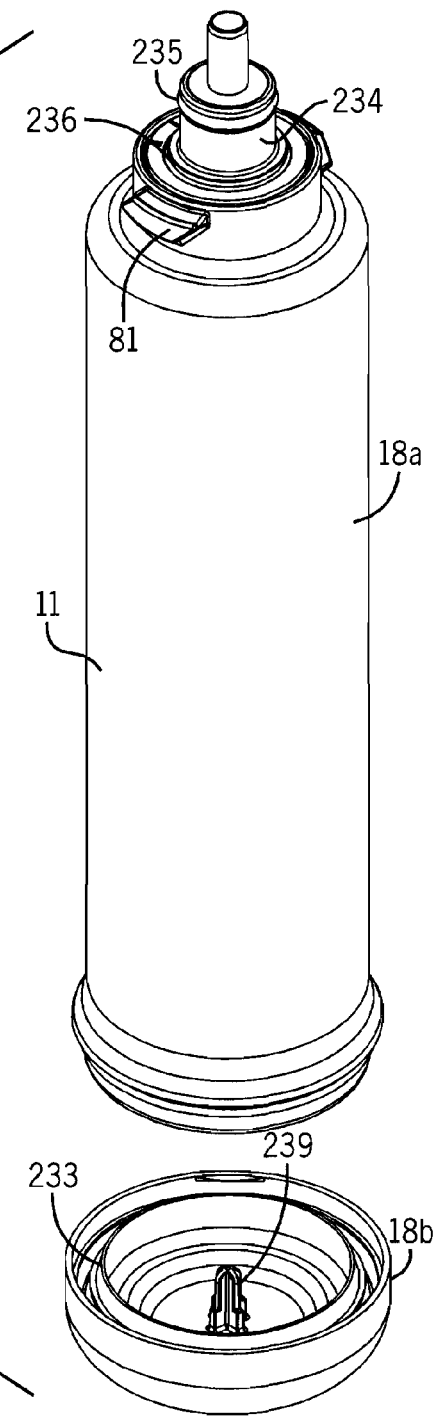
FIG. 30 is a partially exploded view of the assembly of the filter element in FIG. 28 and housing in FIG. 29.

Referring to FIG. 8B and also to FIGS. 28-30, the filter element 78 is assembled into the cartridge 11 utilizing a unique filter element positioning and stabilizing method. The filter element 78, which may comprise a granular activated carbon or porous carbon block filter element is inserted axially through a bottom opening 230 in the cartridge body 74. The filter element 78 has an upper end cap 231 that engages the inside of the cartridge neck 75. Specifically, the upper end cap 231 engages four equally spaced circular flats 232 to provide a stop to further axial movement in the upward direction. The filter element 78 is secured within the cartridge body 74 with a bottom end cap 233 that, in the preferred embodiment, is spin welded to the bottom opening 230. The bottom end cap 233 has a centering post 239 that engages a center recess 241 in an end closure 242 of the filter element 78. In order to facilitate spin welding, it is desirable to attach the bottom end cap with the filter cartridge assembly positioned vertically. This, in turn, requires that the filter element 78 be retained against downward vertical movement until the bottom end cap 233 has been successfully spin welded to the opening 230 in the cartridge body 74. The upper end cap 231 includes an upwardly extending filter neck 234 that defines the water inlet 76 and outlet 77, the upper end of the former provided with an upper O-ring seal 235 that engages the interior of the spindle body 71. The lower portion of the filter neck 234 is provided with a lower O-ring seal 236 that provides sealing contact with the interior of cartridge body neck 75. To retain the filter element 78 for the spin welding process, after insertion of the element axially into the filter body against the flats 232, a retaining ring 237 is inserted in a circular groove 238 in the portion of the neck just above the upper end of the cartridge body neck 75. The groove 238 for the retaining ring 237 is shallow and results in the retaining ring extending radially over the inner edge of the top end of the neck 75. The retaining ring 237 provides a positive stop against reverse axial downward movement of the element in the cartridge body, thereby enabling the spin weld process to fully and securely enclose the bottom of the cartridge. The retaining ring 237 provides no sealing function and may be left in place when the cartridge is attached to the filter head 26.

The cartridge bottom end cap 233 is preferably partially enclosed by a cap grip ring 240 that is snapped over the peripheral edge of the bottom end cap. The grip ring 240 is made of a softer rubber-like plastic to facilitate gripping by the user for cartridge installation or removal. Further, the grip ring 240 may be colored to provide a code to assist the user in selecting and installing the proper filter cartridge.

We claim:

1. A method for assembling a water filter element in a housing to provide a replaceable filter cartridge, the housing having an open operative end defined by an annular reduced diameter portion and the filter element having an end enclosure with an axially extending neck sealingly engaging the interior of the reduced diameter portion, extending axially therepast to a stop position in which the end closure is in engagement with the housing, and having an inlet and an outlet for water, the method comprising the steps of:

(1) providing the opposite end of the housing with an annular opening for receipt of the filter element;
(2) inserting the filter element axially through the annular opening until the element reaches the stop position;
(3) attaching a retaining ring to the neck of the filter element at a position axially beyond and in engagement with the end of the reduced diameter portion of the housing when the filter element is in the stop position to retain the element from reverse axial movement; and,
(4) attaching a housing end cap to the housing annular opening to seal the opening and hold the filter element in the stop position.

2. The method as set forth in claim 1 including the steps of:
(1) providing an annular groove in the neck of the element; and,
(2) placing the retaining ring in the annular groove.

3. The method as set forth in claim 2 wherein the retaining ring comprises an O-ring.

4. The method as set forth in claim 1 wherein the step of attaching the housing end cap comprises spin welding.

5. The method as set forth in claim 1 including the step of attaching a cap grip to the housing end cap.

6. The method as set forth in claim 5 including the step of coding the cap grip with cartridge identification indicia.

7. The method as set forth in claim 5 wherein the coding step comprises color coding.

8. The method as set forth in claim 5 wherein the cap grip attaching step comprises snap fitting.

9. The method as set forth in claim 5 including the step of providing the cap grip with a high friction surface to enhance manual gripping.

10. A subassembly for use in the assembly of a replaceable filter cartridge comprising:

a cylindrical housing having an open operative end defined by an annular reduced diameter portion and an annular opening in the opposite end of a diameter larger than the diameter of the open operative end;

a filter element positioned in the housing and having an end closure with an axially extending neck in sealing contact with the interior of the reduced diameter portion, and a major diameter smaller than the annular opening and larger than the open operative end, said filter element positioned in the housing against an axial stop to define an operative position; and, a retaining ring attached to the filter element neck at a position axially beyond and in engagement with the end of the reduced diameter portion of the housing to retain the element from axial movement.

11. The subassembly as set forth in claim 10 including a bottom end cap attached to the opposite end of the housing to enclose the filter element therein.

12. The subassembly as set forth in claim 11 including a grip ring attached to the peripheral outer edge of the end cap.

* * * * *